United States Patent
Alam et al.

(10) Patent No.: US 9,960,964 B2
(45) Date of Patent: May 1, 2018

(54) SYSTEM, METHOD AND APPARATUS TO MANAGE SERVICES IN A NETWORK

(71) Applicant: CELLOS SOFTWARE LTD, Melbourne (AU)

(72) Inventors: Adnan Hasnain Alam, New Delhi (IN); Anurag Srivastav, Delhi (IN)

(73) Assignee: Cellos Software Ltd, Melbourne (AU)

( * ) Notice: Subject to any disclaimer, the term of this patent is extended or adjusted under 35 U.S.C. 154(b) by 256 days.

(21) Appl. No.: 14/624,182

(22) Filed: Feb. 17, 2015

(65) Prior Publication Data
US 2015/0236902 A1    Aug. 20, 2015

Related U.S. Application Data

(60) Provisional application No. 61/941,256, filed on Feb. 18, 2014.

(51) Int. Cl.
*G06F 15/177* (2006.01)
*H04L 12/24* (2006.01)
*H04L 29/08* (2006.01)

(52) U.S. Cl.
CPC ............ *H04L 41/082* (2013.01); *H04L 67/16* (2013.01); *H04L 41/0866* (2013.01); *H04L 41/5058* (2013.01)

(58) Field of Classification Search
CPC ........ H04L 41/082; H04L 67/16; H04L 12/24
USPC ......................................... 709/221
See application file for complete search history.

(56) References Cited

U.S. PATENT DOCUMENTS

| | | | | |
|---|---|---|---|---|
| 6,466,949 B2 * | 10/2002 | Yang | ................. | G06F 17/30575 |
| 7,562,363 B1 * | 7/2009 | Belair | .................. | G06F 9/4881 718/102 |
| 7,698,276 B2 * | 4/2010 | Seshadri | ........... | G06F 17/30867 719/318 |
| 7,711,780 B1 * | 5/2010 | Durand | ................. | H04L 45/306 709/206 |
| 7,747,717 B2 * | 6/2010 | Colrain | ................. | G06F 9/5061 709/204 |
| 7,853,643 B1 * | 12/2010 | Martinez | ................. | H04L 29/06 709/201 |
| 8,078,903 B1 * | 12/2011 | Parthasarathy | ..... | H04L 63/0428 380/278 |

(Continued)

*Primary Examiner* — Joseph W Avellino
*Assistant Examiner* — Binod J Kunwar
(74) *Attorney, Agent, or Firm* — Shumaker, Loop & Kendrick, LLP

(57) ABSTRACT

System, method and apparatus to manage services in a network are provided. The system includes at least one administration node and a plurality of application nodes, which are connected to each other. A first application node from the plurality of application nodes upon receiving at least one instruction from one of the at least one administration node initializing a first process, and the first application node retrieves configuration information from one of the at least one administration node. The configuration information includes a group name, a cluster name, and a service name related to the first process from a database of one of the at least one administration node. After retrieving the configuration information from said corresponding administration node, the first application node assigns, a name which includes the group name, the cluster name, the service name along with a process name, to the first process.

10 Claims, 14 Drawing Sheets

(56) References Cited

U.S. PATENT DOCUMENTS

| | | | | |
|---|---|---|---|---|
| 8,108,623 | B2 * | 1/2012 | Krishnaprasad | G06F 12/0873 711/133 |
| 8,335,762 | B2 * | 12/2012 | Gbadegesin | G06F 17/30516 707/628 |
| 8,713,186 | B2 * | 4/2014 | Chidambaran | H04L 67/14 709/225 |
| 8,918,529 | B1 * | 12/2014 | Batchu | H04L 63/08 709/229 |
| 2008/0065683 | A1 * | 3/2008 | Theeten | H04L 67/16 |
| 2008/0154957 | A1 * | 6/2008 | Taylor | G06F 9/4411 |
| 2009/0249369 | A1 * | 10/2009 | Itoh | G06F 8/73 719/328 |
| 2010/0242053 | A1 * | 9/2010 | Nitzsche | G06F 9/465 719/317 |
| 2012/0042040 | A1 * | 2/2012 | Bailey | G06F 9/5055 709/217 |
| 2012/0198268 | A1 | 8/2012 | Qureshi | |
| 2013/0042230 | A1 * | 2/2013 | Little | G06F 8/65 717/173 |
| 2013/0304849 | A1 * | 11/2013 | Mehta | H04L 63/02 709/217 |
| 2015/0271132 | A1 * | 9/2015 | Erb | H04L 61/1511 709/223 |

* cited by examiner

SYSTEM, METHOD AND APPARATUS TO MANAGE SERVICES IN A NETWORK

CROSS-REFERENCE TO RELATED APPLICATION

This application claims the benefit of priority under 35 U.S.C. § 119(e) to U.S. Provisional Patent Application Ser. No. 61/941,256 filed on Feb. 18, 2014.

TECHNICAL FIELD

The present invention relates to a system, a method and an apparatus to manage services in a network, and more particularly to methods of assigning/creating names of services and their respective processes running in a plurality of computing machines while providing real time updates on any changes in configuration information of processes of any services.

BACKGROUND

FIG. 1 is a schematic diagram illustrating an exemplary network infrastructure. Referring to FIG. 1, there are plurality of physical computing machines N1, N2, . . . , Nx logically connected to each other. The physical computing machines may be called "nodes" N1, N2, . . . , Nx in the present disclosure, and these nodes N1, N2, . . . , Nx form a network infrastructure 10. For instance, nodes N1, N2, . . . , Nx may be connected with each other via high speed local area network or placed in a blade server cabinet connected with each other via high speed bus connections. The operator of the nodes N1, N2, . . . , Nx may provide services to many users such as users operating on computing devices U1, U2 connected to the network infrastructure 10 via the Internet 11. Usually, each service may include a plurality of processes running in any of the nodes N1, N2, . . . , Nx in the network infrastructure 10, and each node may have multi-core processors for simultaneously running multiple processes.

The conventional domain name service (DNS) relies on DNS server storing the forward address mapping of the domain name of the process/service to the Internet addresses along with port numbers of processes. However, the conventional DNS server relies on fixed duration of DNS updates in which the clients of DNS server are notified of any change in DNS through "PULL" notification/query, and this "PULL" at fixed term may prevent the service instance from on-time detecting any process under itself experiencing failure, being initialized, being suspended, being shut down, being restarted/reboot or being migrated from a current core to another core of the same node or being migrated from one node to another node. In short, the conventional DNS system cannot achieve on-time notification of any changes in the operational status and communication addresses of any process experiencing failures or configuration changes in the network infrastructure 10.

In this context, there is a need for solutions to provide a method or system to manage the plurality of processes of service in a network infrastructure. The solution should at least address how to discover services or how to discover processes, under each service when the processes may experience unexpected failure, being initialized, being suspended, being shut down, are being restarted/rebooted or migrated from the current core to another core of the same node or being migrated from one node to another node.

SUMMARY

In view of the foregoing, an embodiment herein provides a system, a method and an apparatus to manage services in a network. Accordingly, the proposed system includes at least one administration node and a plurality of application nodes connected to each other and at least one of the administration nodes. A first application node from the plurality of application nodes upon receiving at least one instruction from one of the at least one administration node to initialize a first process, the first application node performs the following: retrieving, configuration information comprising a group name, a cluster name, and a service name related to the first process from a database of one of the at least one administration node; and assigning, a name comprising the group name, the cluster name, the service name along with a process name, to the first process.

In one embodiment, the first application node is configured to perform the following: initializing, the first process in the first application node, upon receiving the at least one instruction from said corresponding administration node and notifying, other services or other processes in the network about the assigned process name of the first process.

In one embodiment, the first application node may be further configured to perform the following: determining, which of other services or other processes in the network that the first process is interested in receiving notification of any change in the configuration information of the other services or the other processes; and subscribing, the interest of the first process to the plurality of application nodes on which the other services or the other processes are running.

In another embodiment, the first application node is further configured to determine any of the other services or the other processes is interested in receiving notification of any change in the configuration information or operational status of the first process; and registering the determined services or the determined processes that is interested in receiving notification of any change in the configuration information or operational status of the first process.

In another embodiment, the first application node may be further configured to perform the following: determining, whether the first process is successfully shut down and notify, the registered services or the registered processes about any change in the configuration information of the first process, when the first process is successfully shut down.

In another embodiment, the first application node may be further configured to perform the following: determining any change in the configuration information or the operational status of the first process, and notifying the registered services or the registered processes about the change in the configuration information or the operational status of the first process. The change of the configuration information may comprise change of application node on which the first process is operating, change of a network layer address of the first process, or change of port number of the first process. The change of operational status may comprise: the first process experiencing failure, the first process being accidentally shutdown, the first process being restarted, the first process being migrated or the first process being successfully shutdown. Furthermore, the first application node may be configured to notify the registered services or the registered processes about any change in the configuration information or the operational status of the first process, by generating a conditional update message containing at least one name string matching to process names of the registered services or the registered processes; and forward the conditional update message according to the at least one name string.

In yet another aspect, the first application node may be further configured to perform the following: determining, whether the first process is successfully migrated to a second application node from the first application node; and notifying, the registered services or the registered processes about any change in the configuration information of the migrated first process. The first application node may be configured to perform the following: determining, whether the first process experiences a failure; and notifying, the registered services or the registered processes running in the network, about any change in the configuration information of the first process, when the first process experiences the failure. The first application nodes may notify the registered services or the registered processes about any change in the configuration information of the first process, by generating a conditional update message containing at least one name string matching to process names of the registered services or the registered processes and forwarding, the conditional update message according to the at least one name string.

In one embodiment, a method to manage services in a network is provided. The method includes: retrieving by one of application nodes in the network configuration information; and assigning by said one of the application nodes, a name includes the group name, the cluster name, the service name along with a process name, to the first process running on the one of the application nodes from a plurality of application nodes in the network. The configuration information includes a group name, a cluster name, and a service name related to a first process from a database of one of at least one administration node in the network. After the step of assigning the name to the first process, the method further includes: initializing by said one of the application nodes, the first process in said one of the application nodes, upon receiving at least one instruction from one of at least one administration node and notifying by said one of the application nodes, other services or other processes in the network about the assigned name of the first process.

In one embodiment, after the step of initializing the first process, the method further includes: determining by said one of the application nodes, which of the other services or the other processes in the network that the first process is interested in receiving notification of any change in the configuration information of the other services or the other processes; and subscribing by said one of the application nodes, the interest of the first process to the application nodes on which the other processes are running The method may further include: determining by one of the application nodes, any of other services and any of other processes that is interested in receiving notification of any change in configuration information or operational status of the first process; and registering at said one of the application nodes the determined services or the determined processes that is interested in receiving notification of any change in the configuration information or the operational status of the first process.

In another embodiment, the method further comprise: determining any change in the configuration information or the operational status of the first process; and notifying by said one of the application nodes, the registered services or the registered processes about any change in the configuration information or the operational status of the migrated second process. The change of the configuration information may comprise: change of application node on which the first process is operating, change of a network layer address of the first process, or change of port number of the first process. The change in the operational status comprises: the first process experiencing failure, the first process being accidentally shutdown, the first process being restarted, the first process being migrated or the first process being successfully shutdown.

In another embodiment, in the step of notifying the registered services or the registered processes about any change in the configuration information or the operational status of the first process, the method further comprises: generating a conditional update message containing at least one name string matching to process names of the registered services or the registered processes; and forwarding, the conditional update message according to the at least one name string.

In yet another aspect, the method further includes: determining by said one of the application nodes, whether a second process is successfully migrated to the application node from the other application node and notifying by said one of the application nodes, the registered services or the registered processes about any change in the configuration information of the migrated second process.

In another embodiment, the method may further include determining by said one of the application nodes, whether the first process experiences a failure and notifying, the registered services or the registered processes running in the network, about any change in the configuration information of the first process when the first process experiences the failure. In the step of notifying the registered services or the registered processes, the method may further include: notifying by said one of the application nodes, the registered services or the registered processes about any change in the configuration information of the first process, by generating a conditional update message containing at least one name string matching to names of the registered services or the registered processes and forwarding, the conditional update message according to at least one name string.

In yet another embodiment, the method includes: determining whether the first process is successfully shut down and notifying by one of the application nodes, the registered services or the registered processes about any change in the configuration information of the first process, when the first process is successfully shut down.

In yet another embodiment, there is provided an apparatus adapted to manage services in a network. The apparatus may include a network interface and a communication manager unit. The network interface is connected to at least one administration node and at least one application node, in the network. The communication manager unit is connected to the network interface and configured to: retrieve configuration information comprising a group name, a cluster name, and a service name related to a first process from a database of one of the at least one administration node; and assign a name comprising the group name, the cluster name, the service name along with a process name, to the first process. The communication manager unit is configured to: initialize the first process in the apparatus, upon receiving at least one instruction from one of said at least one administration node through the network interface; and notify other services or other processes in the network about the assigned name of the first process. The communication manager unit is also configured to: determine which of the other services or the other processes in the network is interested in receiving notification of any change in the configuration information or the operational status of the first process; and register at the communication manager unit the determined other services or the determined other processes that is interested in receiving notification of any change in configuration information or the operational status of the first process.

In another embodiment, the communication manager unit is further configured to: determine any change in the configuration information or the operational status of the first process; and notify the registered services or the registered processes about any change in the configuration information or the operational status of the first process. The communication manager unit is also configured to: notify the registered services or the registered processes about any change in the configuration information of the first process, by generating a conditional update message containing at least one name string matching to names of the registered services or the registered processes; and forward the conditional update message according to the at least one name string through the network interface. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

Embodiments of the invention will now be described by way of example only with reference to the accompanying drawings, in which.

DETAILED DESCRIPTIONS OF EXEMPLARY EMBODIMENTS

In order to address the problems or challenges of discovering services or discovering processes under each service in a network infrastructure, the present invention proposes a system, a method, and an apparatus to manage services in a network infrastructure.

Figure 1:
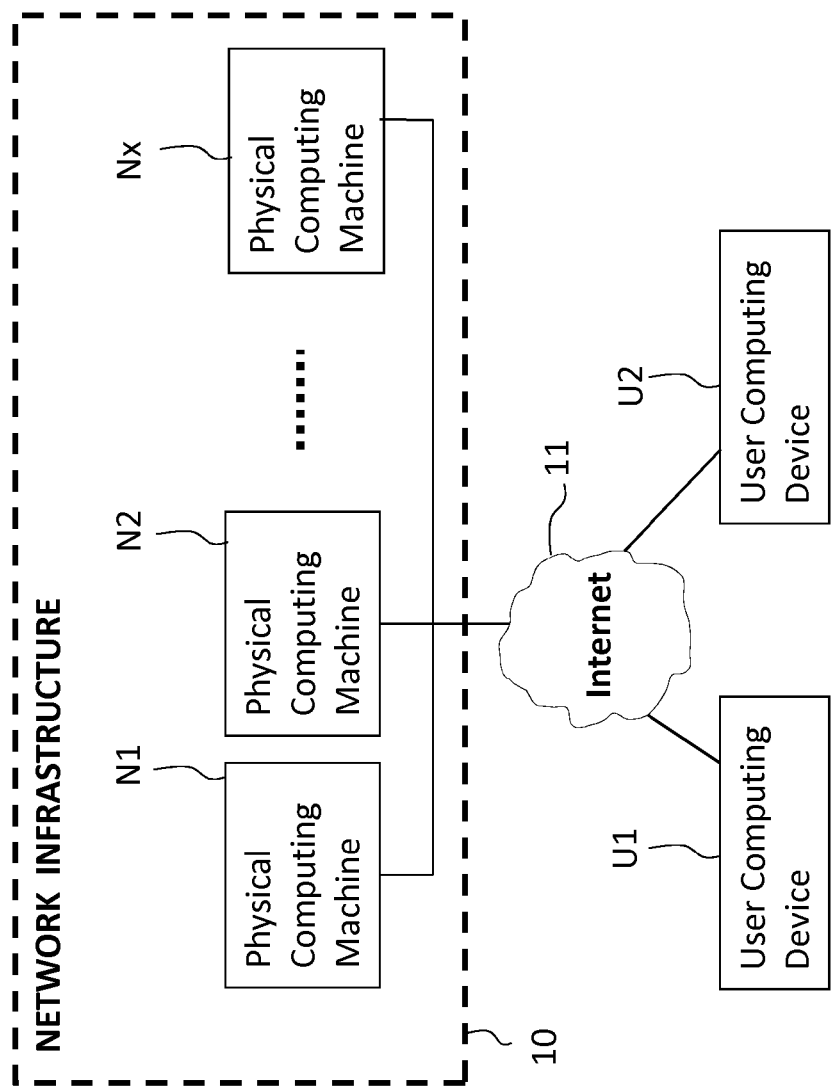
FIG. 1 is a schematic diagram illustrating an exemplary network infrastructure system.
Figure 2:
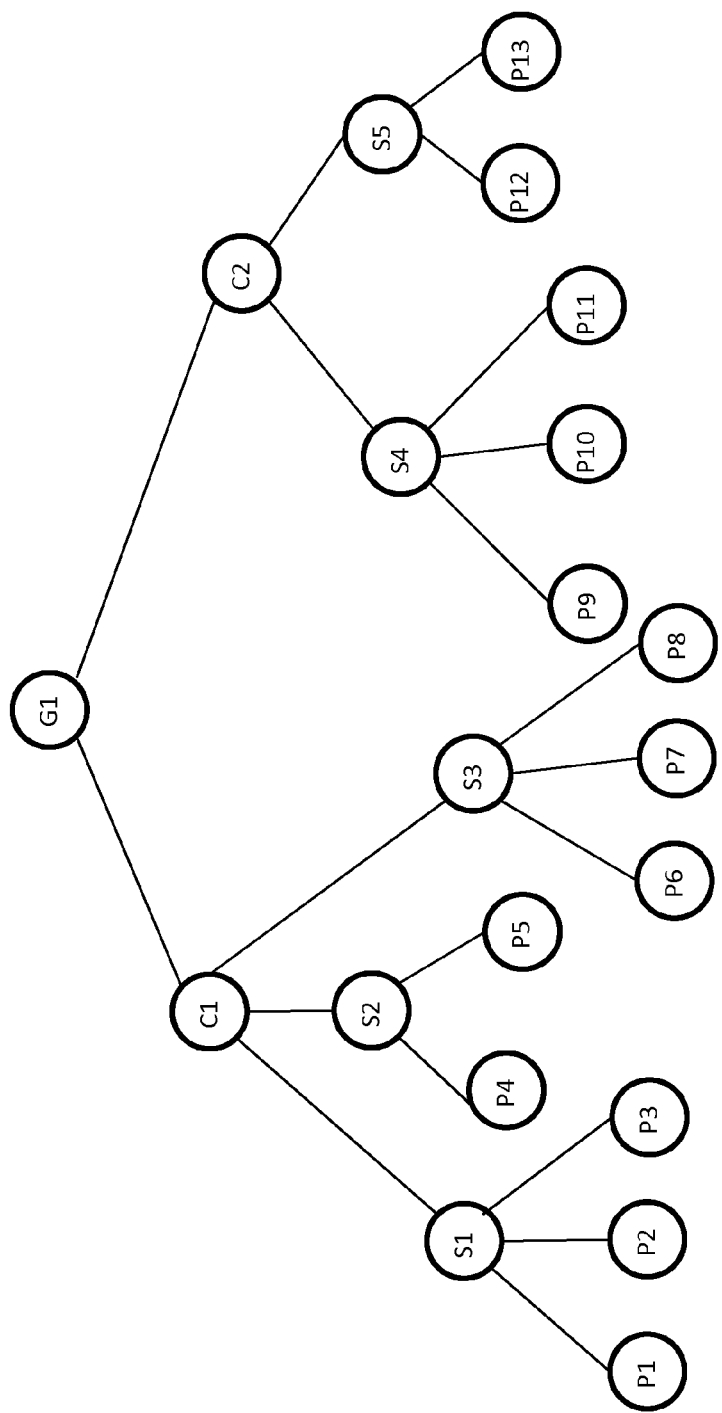
FIG. 2 is a schematic diagram illustrating an exemplary logical structure of the services and their respective processes running on multiple nodes in the network infrastructure.

FIG. 2 is a schematic diagram illustrating an exemplary logical structure of the services and their respective processes running on multiple nodes in the network infrastructure as shown in FIG. 1. Referring now to FIG. 2, due to system scalability and load balancing of the network infrastructure 10, the corresponding operator may determine to distribute processes of each services across the nodes N1, N2, . . . , Nx. The example shown in FIG. 2 starts from a logical node G1, which may represent a group of business functions that may be provided to a particular user or a particular set of users. Here, for instance, the user may refer to a person using a user computing device U1.

Under G1, there may be multiple clusters of services and the clusters being represented by C1 and C2. Under the cluster C1, there may be multiple service objects further down the hierarchical structure such as services S1, S2, and S3. Similarly, under the cluster C2, there may be multiple service objects further down the hierarchical structure such as services S4 and S5. Further down to the processes of each service in the hierarchical structure, there may be processes P1, P2 and P3 under the service S1. The processes P1-P3 may altogether enable the basic computational functions of the service S1. Similarly, there may be processes P4, and P5 under the service S2; processes P6, P7 and P8 under the service S3; processes P9, P10 and P11 under the service S4; and processes P12 and P13 under the service S5.

The logical hierarchical structure of "group-cluster-service-processes" is in fact a simplified diagram. In practice, there may be several groups which respectively include their own clusters; under each cluster, there may be several services; and there may be dozens, hundreds or even thousands of processes being running simultaneously for each service. The complicated nature of the network infrastructure 10 may be intensified when hundreds of processes belonging to the same services may spread over multiple nodes N1, N2, . . . , Nx in the network infrastructure 10.

There may be a centralized management software or management entity, which may control the overall system computation efficiency of the network infrastructure 10 by initiating, suspending, shutting down, restarting processes or migrating processes from one node to another node for each service. When there are hundreds of processes under each service instance of services such as S1, S2, S3, S4, and S5; and each process may experience failure or be initialized, suspended, shutdown, restarted or migrated from one node to another node very frequently, and it is anticipated that each service instance may be unable to track the network layer/Internet addresses along with port numbers of processes to which they belong.

Figure 3:
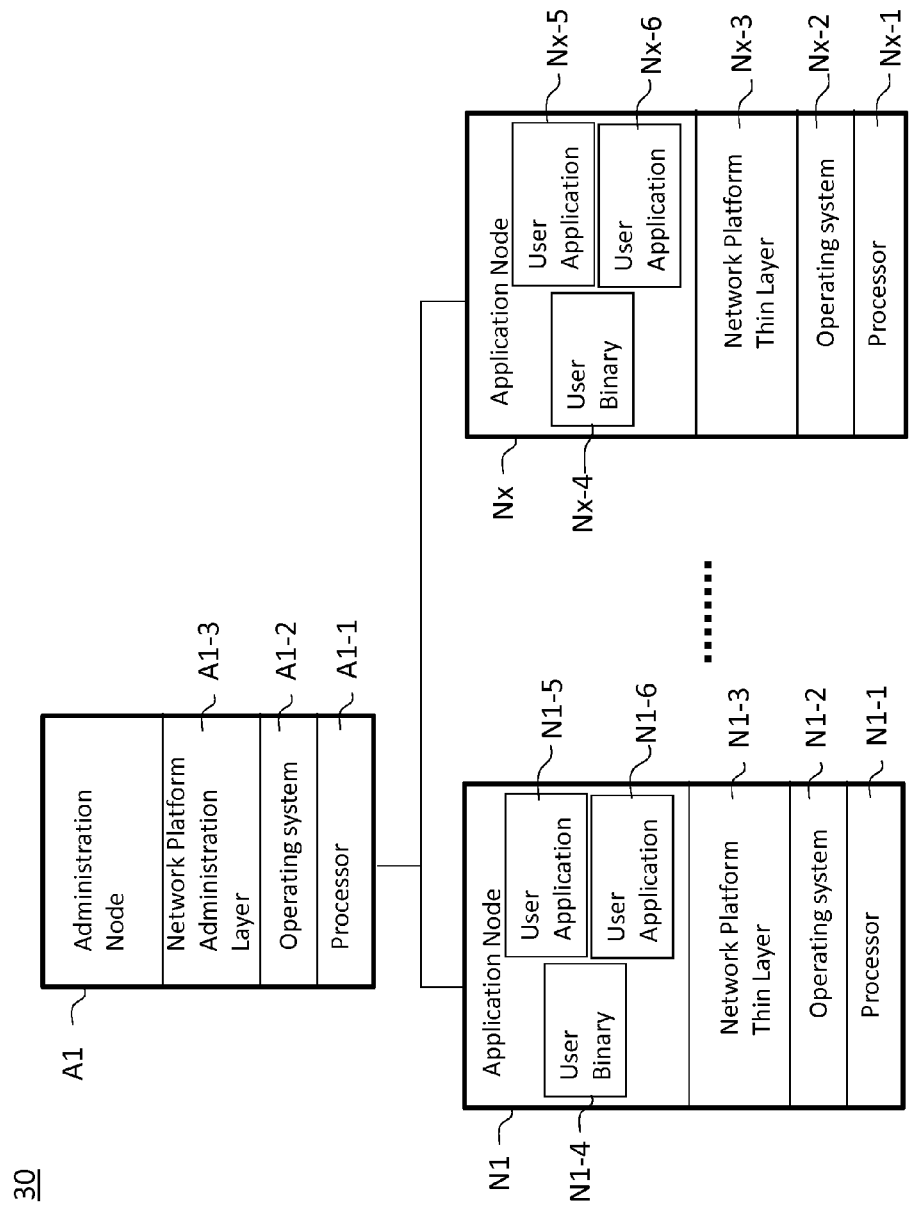
FIG. 3 is a schematic diagram illustrating a system of network infrastructure according to an exemplary embodiment.

The proposed method to manage services in the network infrastructure 10 may be applied in a system as shown in FIG. 3. FIG. 3 is a schematic diagram illustrating a system of network infrastructure according to an embodiment of present invention. Referring to FIG. 3, a network infrastructure 30 may include at least one administration node A1 and a plurality of application nodes N1, . . . , Nx. The plurality of application nodes N1, . . . , Nx and the administration node A1 may be connected with each other logically via LAN, via Internet or via high speed bus links. For the load balancing of the administration node A1, there may be more than one administration node configured to be operative in the network infrastructure 30.

In a simplified illustration, the administration node A1 may include a processor A1-1, an operating system A1-2 running by the processor A1-1, a network platform administration layer A1-3 running on top of the operating system A1-2. Furthermore, the network platform administration Layer A1-3 may include other logical elements responsible for managing or monitoring other application nodes N1, . . . , Nx. Additionally, the administration node A1 may include other hardware or software units such as a networking interface configured for communicating with other nodes in the network infrastructure 30.

In a simplified illustration, each node of the application nodes N1, . . . , Nx may include a processor N1-1, an operating system N1-2 running by the processor N1-1, a network platform thin layer N1-3 running on top of the operating system N1-2. There may be at least one user binary N1-4 or at least user applications N1-5, N1-6 running on top of the network platform thin layer N1-3. Furthermore, the network platform thin layer N1-3 may include a first logical element responsible for monitoring and managing user binary or user application(s), and a second logical element responsible for communications with the other application nodes and the administration node. Similarly, the node Nx may include a processor Nx-1, an operating system Nx-2 running by the processor Nx-1, a network platform thin layer Nx-3 running on top of the operating system Nx-2. Also, there may be at least one user binary Nx-4 or at least one user application Nx-5, Nx-6 running on top of the network platform thin layer Nx-3. For the simplicity of illustration, networking interfaces of the administration node A1 are omitted from FIG. 3.

Figure 4:
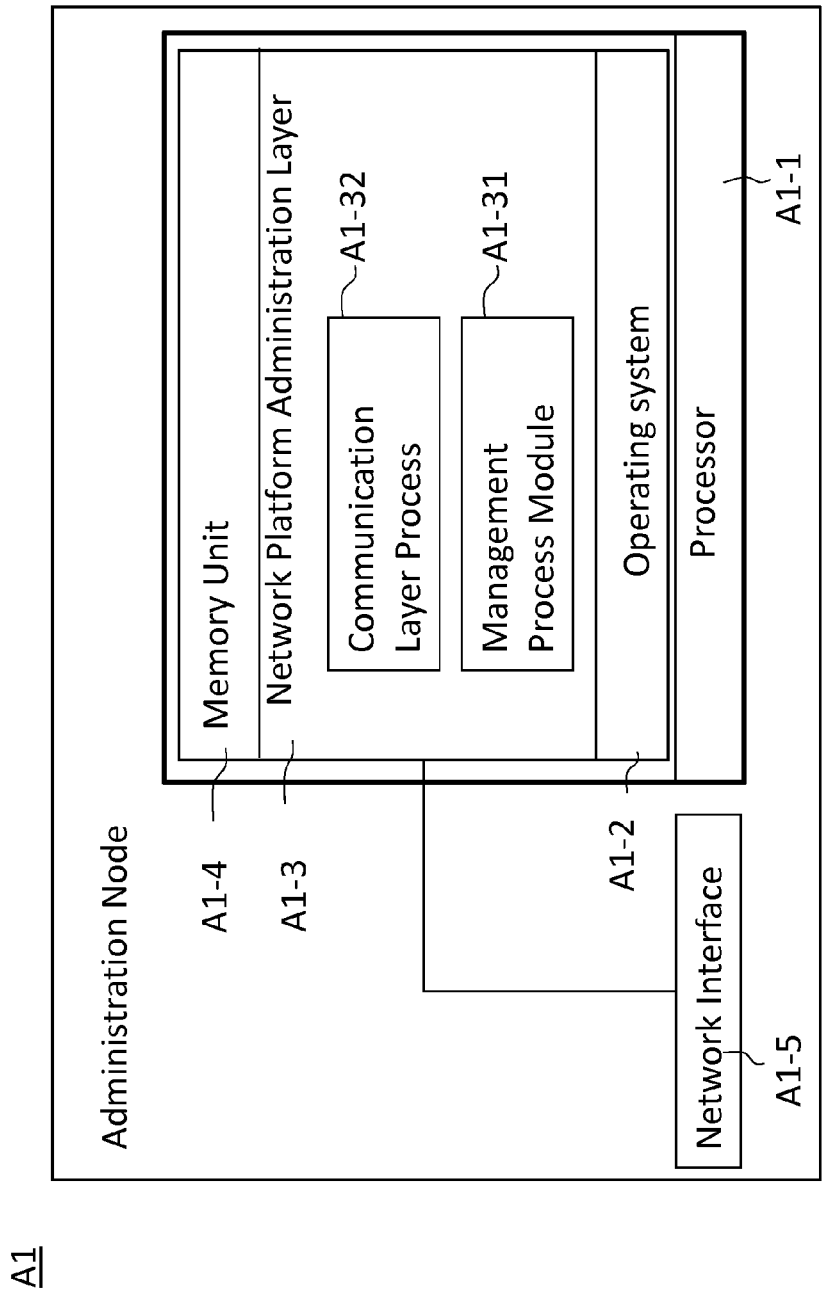
FIG. 4 is a schematic diagram illustrating functional elements of an administration node according to an exemplary embodiment.

The detailed functional elements of the network platform administration layer A1-3 will be provided in accordance with FIG. 4. The detailed functional elements of the network platform thin layer N1-3 will be provided in accordance with FIG. 5.

FIG. 4 is a schematic diagram illustrating functional elements of the administration node A1 according to an exemplary embodiment of the present invention. Referring to FIG. 4, the administration node A1 may include a processor A1-1, a memory unit A1-4, an operating system A1-2 running by the processor A1-1 in the memory unit A1-4, a network platform administration layer A1-3 running on top of the operating system A1-2 in the memory unit A1-4. Also, the network platform administration layer A1-3 may include a communication layer process (CLP) entity A1-32 configured for communicating with other nodes in the computing network infrastructure 30, and may also include at least a management process module A1-31 responsible for managing or monitoring other application nodes N1, . . . , Nx in the network infrastructure 30. Additionally, the administration node A1 may include a network interface A1-5 logically connected to the CLP entity A1-32.

The management process module A1-31 may include software instances or software entities respectively responsible for managing clusters of processes, logging events, raising alarms, monitoring essential process of each application node, storing and updating configuration information of each application node in the computing network infrastructure 30. Also, the management process module A1-31 may include other software entities respectively responsible for receiving input commands from users related to storing, managing and updating configurations of "Groups", configurations of "Clusters" under each "Group", configurations of "Services" under each "Cluster"; and finally configurations of "Processes" under each "Service". The CLP entity A1-32 is configured to provide communication functionalities for other processes in the administration node A1 to communicate with application nodes N1, . . . , Nx. For example, the CLP entity A1-32 may include routing tables related to application nodes N1, . . . , Nx, forward domain name resolution mapping tables of application nodes N1, . . . , Nx, and networking protocol stack software.

Figure 5:
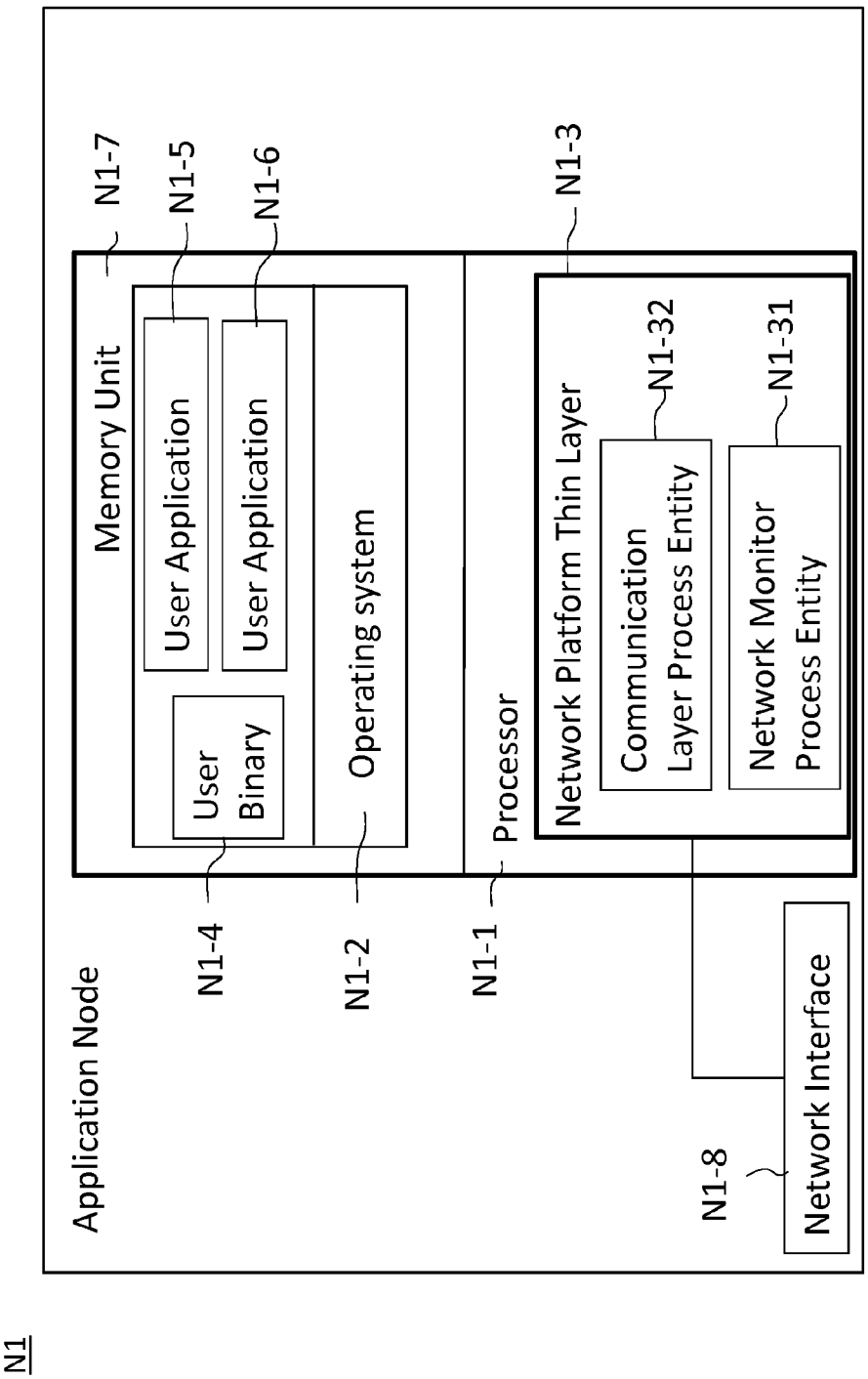
FIG. 5 is a schematic diagram illustrating functional elements of an application node according to an exemplary embodiment.

FIG. 5 is a schematic diagram illustrating functional elements of the application node N1 according to an exemplary embodiment of the present invention. Referring to FIG. 5, most application nodes may have similar functional elements as those in the application node N1. The application node N1 may include a processor N1-1, an operating system N1-2 running by the processor N1-1 in a memory unit N1-7, and a network platform thin layer N1-3 running on top of the operating system N1-2 in the memory unit N1-7. There may be at least one user binary N1-4 or at least user applications N1-5 and N1-6 running on top of the network platform thin layer N1-3.

The network platform thin layer N1-3 may include a network monitoring process (NMP) entity N1-31 responsible for monitoring and managing user binary or user application, and a communication layer process Entity (CLP) entity N1-32 responsible for communications with other application nodes and administration node. There may be at least one user binary N1-4 or at least user applications N1-5, N1-6 running on top of the network platform thin layer N1-3. The NMP entity N1-31 and CLP entity N1-32 may be dedicated electronic circuits. The NMP entity N1-31 may also include software instance or software entities respectively responsible for managing and monitoring processes running on top of the network platform thin layer N1-3. For example, the processes may be user binary N1-4, user application N1-5, user application N1-6 and so forth. In the present embodiments, the user binary N1-4 or the user application N1-5 running in an application node is the process of a service in the network infrastructure 30. The user binary N1-4 may be software, provided by the third party software provider, and the user applications are software, which may be configured in each application node. Additionally, the application node N1 may include a network interface N1-8 may be logically connected to the CLP entity N1-32.

In one embodiment, the CLP entity N1-32 in the network platform thin layer N1-3 of the application node N1 is configured to provide communication functionalities for other processes in the application node N1 to communicate with other application nodes N2, . . . , Nx and the administration node A1. For example, the CLP N1-32 may include routing tables related to the administration node A1 and the application nodes N2, . . . , Nx, forward domain name resolution mapping tables associated to the administration node A1 and the application nodes N2, . . . , Nx, and networking protocol stack software. In one embodiment, the NMP entity N1-31 and CLP entity N1-32 may be dedicated electronic circuits.

In general, the management process module A1-31 of administration node A1 may monitor the NMP entity N1-31 in each application node. Then, the NMP entity in each application node may monitor every other process such as each user application or each user binary. When any user application or user binary experiences failures, experiences working load greater than a pre-configured working load threshold (e.g., 80% of processor usage or 80% of memory utilization for a pre-configured duration of 5 minutes), the NMP entity N1-31 may firstly report these events of failure or abnormal operational condition to the management process module A1-31 in the administration node A1.

In one embodiment, the management process module A1-31 then may instruct the NMP entity of any application node or other application nodes to initiate/initialize a new process according to initialization configuration information of the new process stored in the configuration database in the management process module A1-31. Furthermore, the NMP entity N1-31 of an application node A1 may be instructed by the management process module A1-31 to take some of works or complete works from the process experiencing events of failure or abnormal operational condition(s).

The method to manage services in the present embodiment may also be regarded as "a method of discovering services in a network infrastructure" or "a method of discovering any process of any services in a network infrastructure". The proposed method to manage services in the network infrastructure may include at least following main technical features: (1) Hierarchical Naming system (similar to that of a DNS system), for instance, a process's fully qualified domain name (FQDN) may be: G1.C1.S3.P1, where "G1" is group name, "C1" is cluster name, "S3" is service name and "P1" is process name; (2) Organize processes under a service object; organize services under a cluster object; and organize clusters under a group object; (3) PUSH update notification and Filtered Updates/Conditional Updates.

Figure 6:
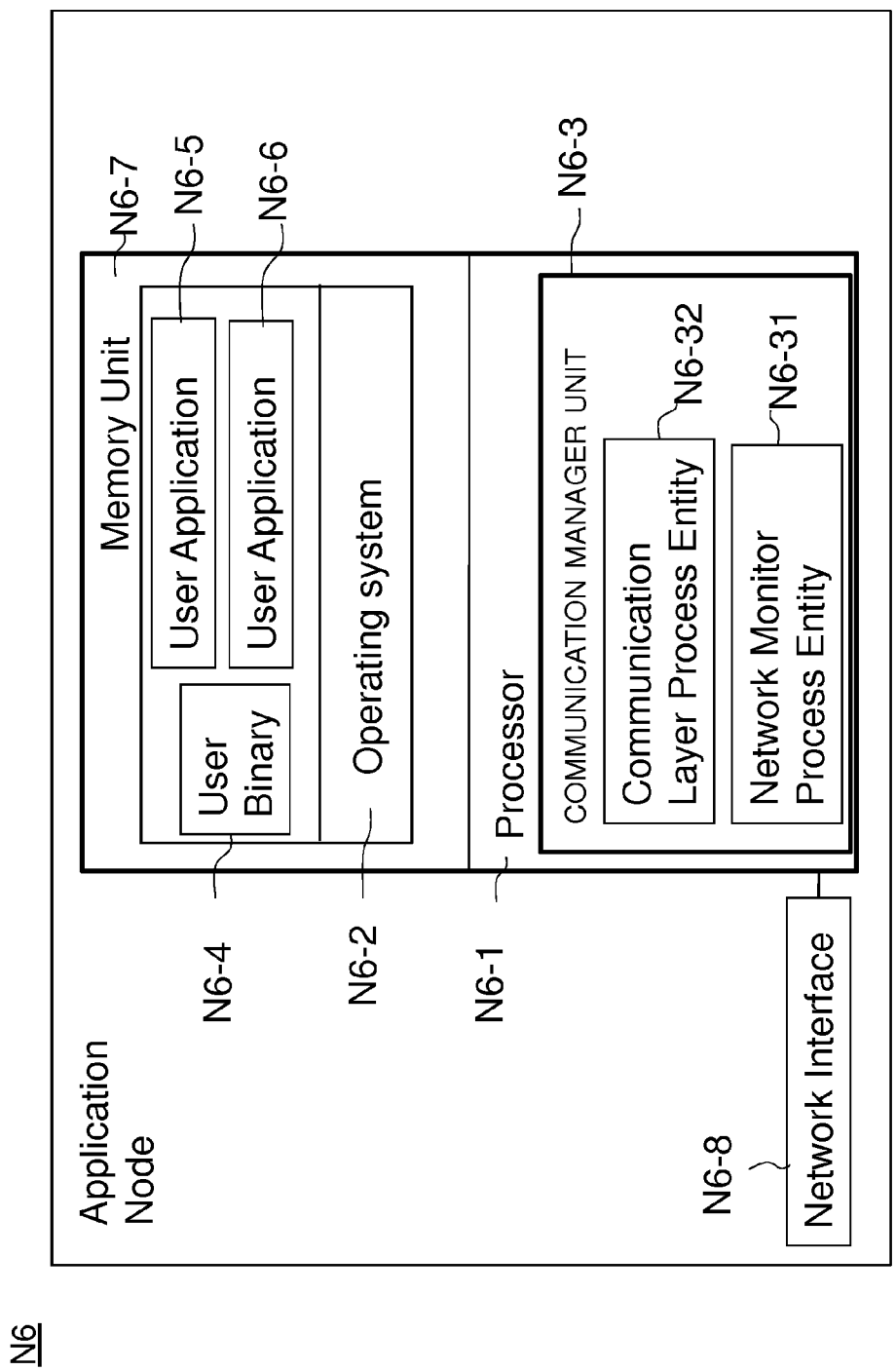
FIG. 6 is a schematic diagram illustrating functional elements of an application node according to another exemplary embodiment.

FIG. 6 is a schematic diagram illustrating functional elements of an application node according to another exemplary embodiment. Referring to FIG. 6, the application nodes may have similar functional elements as those in the application node N6. The application node N6 may include a processor N6-1, an operating system N6-2, a memory unit N6-7, and an operating system N6-2. There may be at least one user binary N6-4 or at least user applications N6-5, N6-6 running on top of the operating system N6-2.

In the processor N6-1, there is a communication manager unit N6-3. The communication manager unit N6-3 may include further include a NMP entity N6-31 responsible for monitoring and managing user binary or user application, and a CLP entity N6-32 for communications with other application nodes and administration node. Also, the user binary N6-4 or the user applications N6-5 and N6-6 may be running on top of the communication manager unit N6-3.

In one embodiment, the processes may be user binary N6-4, user application N6-5, user application N6-6, etc. In the present disclosure, the user binary N6-4 or the user application N6-5 running in an application node is the process of a service in the computing network infrastructure 30. Additionally, the application node N6 may include a network interface N6-8 that may be logically connected to the CLP entity N6-32.

In one embodiment, the NMP entity N6-31 and CLP entity N6-32 may be dedicated electronic circuits. The CLP entity N6-32 of the application node N6 may be configured to provide communication functionalities for other processes in the application node N6 to communicate with other application nodes N2, . . . , Nx and the administration node A1. In another example embodiment, the CLP N6-32 may include routing tables related to the administration node A1 and the application nodes N2, . . . , Nx, forward domain name resolution mapping tables associated to the administration node A1 and the application nodes N2, . . . , Nx, and networking protocol stack software. In yet another example embodiment, the management process module A1-31 then may instruct the NMP entity of any application node or other application nodes to initiate/initialize a new process according to initialization configuration information of the new process stored in the configuration database in the management process module A1-31 of the administration node A1.

In one example embodiment, the application node N6 is proposed as an apparatus to manage services in a network infrastructure 30. The application node N6 may be configured to retrieve configuration information from a configuration database of the administration node A1. The configuration information may include a group name, a cluster name, and a service name related to a first process from a configuration database of the at least one administration node A1. The application node N6 may assign a name which may include the group name, the cluster name, and the service name along with a process name, to the first process.

In another example embodiment, the communication manager unit N6-3 may initialize the first process in one of the application nodes N1-Nx, upon receiving at least one instruction from at least one administration node through the network interface. The communication manager unit N6-3 may also notify other services or other processes in the network about the assigned name of the first process. The communication manager unit N6-3 may be configured to determine which of the other services or the other processes in the network is interested in receiving notification of any change in the configuration information or operational status of the first process and register at the communication manager unit N6-3, the determined other services or the determined other processes that may be interested in receiving notification of any change in configuration information or the operational status of the first process. The change of the configuration information may include but not limited to: change of application node on which the first process is operating, change of a network layer address of the first process, or change of port number of the first process.

In one aspect, the communication manager unit N6-3 may also determine whether a second process is successfully migrated to the application node N1 from the other application node. The communication manager unit N6-3 may determine which other services or other processes are interested in being notified about any change in the configuration information of the second process, when the second process is successfully migrated to one of the application nodes. The communication manager unit N6-3 may notify the determined services or the determined processes about any change in the configuration information or operational status of the migrated second process.

In yet another aspect, the communication manager unit N6-3 may be configured to notify the registered services or the registered processes about any change in the configuration information of the first process, by generating a conditional update message containing at least one name string matching to names of the registered services or the registered processes. The communication manager unit N6-3 may also be configured to forward the conditional update message according to the at least one name string. In another embodiment, the at least one name string is a filtered destination name (for a filtered update message) which may include a combination of a group name, a cluster name, a service name or an assigned process name. In one embodiment, the communication manager unit N6-3 may be the network platform thin layer N1-3 in the application node N1.

Figure 7:
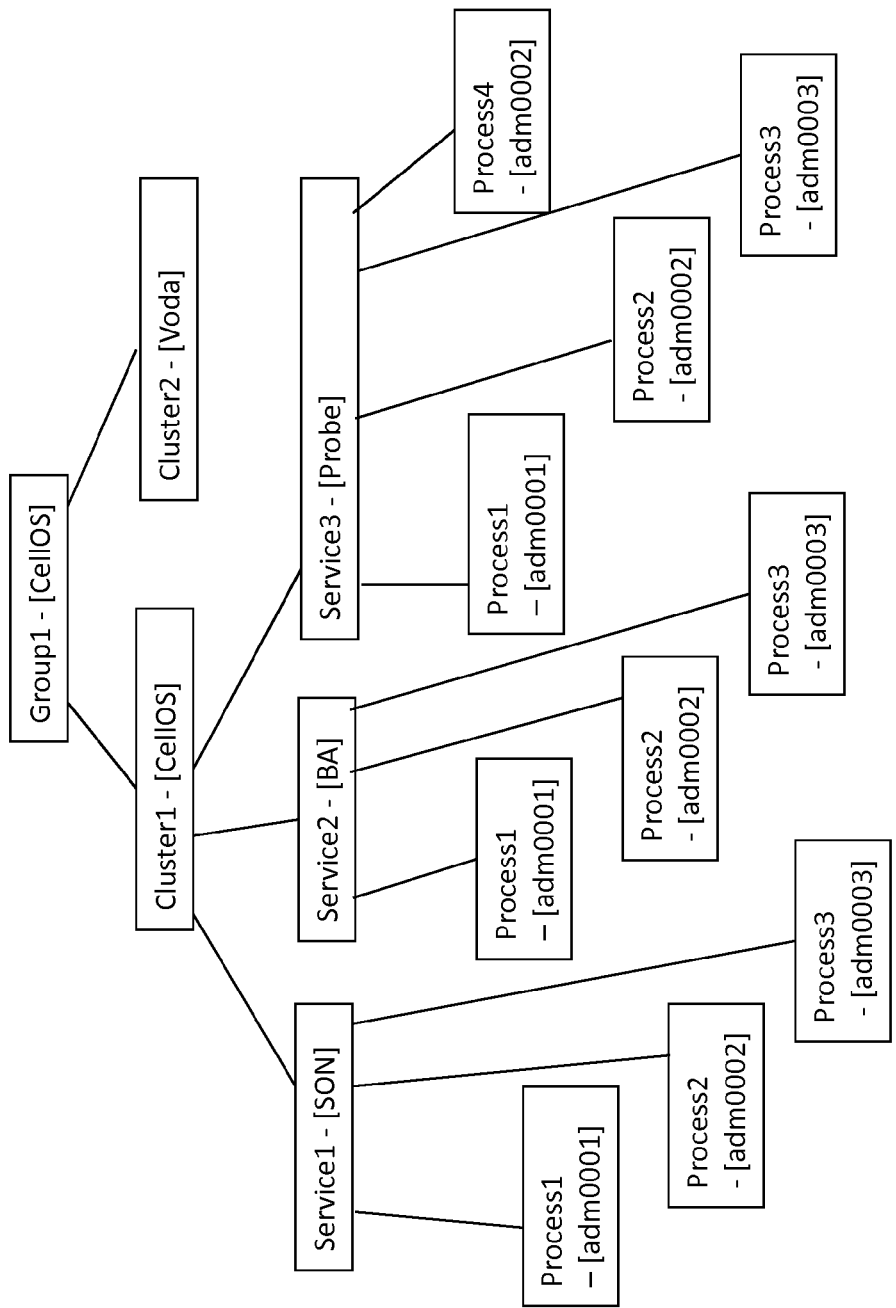
FIG. 7 is a schematic diagram illustrating an exemplary hierarchical structure of processes of services in the network infrastructure.

The method to manage services in the network infrastructure will be described in more detail in accordance with FIGS. 7-8. FIG. 7 is a schematic diagram illustrating an exemplary hierarchical structure of processes of services in a computing network infrastructure. For instance, each cluster under the Group 1 (with a group name of "CellOS") may belong to a telecommunication service provider as a user in the computing network infrastructure 30. For the simplicity of illustration, there are only two clusters shown in FIG. 7 such as "Cluster 1" (with a cluster name of "CellOS") and "Cluster2" (with a cluster name of "Voda"). Also, the detailed elements in the hierarchical structure of "Cluster2" are not shown in FIG. 7, but the logical structure of "Cluster2" may be similar to that of the "Cluster1".

Referring to FIG. 7, under the "Cluster1" (with the cluster name of "CellOS"), there are currently three services such as "Service1", "Service2", "Service3" which respectively have their service names of "SON", "BA" and "Probe". Here "SON", "BA" and "Probe" may represent different business functions/services that the user "CellOS" subscribes to. The second user such as "Voda" may subscribe to different sets of services from those subscribed by the first user "CellOS".

At the instance shown in FIG. 7, there are 3 processes belonging to "Service 1" such as "Process 1", "Process2", "Process3" which respectively are named with "adm0001", "adm0002" and "adm0003". Similarly, there are 3 processes belonging to "Service 2" such as "Process1", "Process2", "Process3" which respectively are named with "adm0001", "adm0002" and "adm0003". Similarly, there are 4 processes belonging to "Service 3" such as "Process1", "Process2", "Process3" and "Process4" which respectively are named with "adm0001", "adm0002", "adm0003" and "adm0004".

Not all process objects belonging to the same service object are running in the same application node. For example, "Process1", "Process2", "Process3" belonging to "Service2" may be running in different application nodes. In one embodiment, the process objects belonging to the same service object may be running in different application nodes, or even running in application nodes at different geographic locations.

The process objects and even service objects will be assigned with network layer addresses and transport layer addresses. Every process object is an instance of service to which it belongs. For example, the "Process1", "Process2", "Process3" under the "Service2" may be assigned respectively with tuples of IP address and port number such as {192.168.1.1, 1024}, {192.168.11.1, 2048} and {192.168.51.1, 1234}. By using "Hierarchical Naming system", every process object in the logical structure of "Cluster1" may be easily named logically and managed according to their assigned names.

For instance, under the "Service3", "Process1" is initialized before "Process2", "Process2" is initialized before "Process3", "Process3" is initialized before "Process4" and so forth. The "Service3" object will store the sequence of process objects and assigned names/FQDNs of all process objects in the application programming interface of the first process under itself. Also, the process objects belonging to the same service will be notified with the operational status of the process objects and thus they may all know the assigned names/FQDNs of all process objects. The CLP entity N1-32 in each application node will store the forward domain name resolution mapping relationships between the assigned name of each process and the communication address such as the IP address and the port number assigned to the process.

For another example, when the "Process1" under the "Service1" is first initialized by the NMP entity of an application node as a result of instruction of the management process module A1-31 of administration node A1, the NMP entity N1-31 may assign the "Process1" with a name as "cellos.cellos.nmp.adm0001". The assigned name of "Process1" in this example follows the logical sequence of the logical structure such as: Group->Cluster->Service->Process). Similarly, when the "Process2" is first initialized by the NMP entity of an application node according to instruction of the management process module A1-31, the NMP entity may assign "Process2" a name as "cellos.cellos.nmp.adm0002"; when the "Process3" is first initialized by the NMP entity of an application node according to the instruction of the management process module A1-31, the NMP entity may assign "Process3" with a name as "cellos.cellos.nmp.adm0003".

By using such "Hierarchical Naming system", the following effects may be first achieved: (1) Distinguishable Name Space; (2) Guessable names for new services; and (3) Human readable name. Regarding "Distinguishable Name Space", every process object/instance of service will be assigned with a unique name or FQDN.

Regarding "Guessable names for new services", the NMP entity in any application node may easily guess name of all other services, or even each process may guess name of other process objects belonging to the same service. For example, the NMP entity will always be the first process initialized under each service, therefore the NMP entity may be named with a process name of "proc1" or "adm0001". As such, the full name or FQDN of the first process in a "SON" service may be: "cellos.cellos.SON.proc1". Then, the second process object initialized for the same "SON" service may be "cellos.cellos.SON.proc2". Suppose the sequence of objects in the namespace is backward, then the first process in a "SON" service may be named with "proc1.SON.cellOS.cellos" and the second process in a "SON" service may be named with "proc2.SON.cellOS.cellos". Additionally, regarding "Human readable name", human can derive name by logic very easily according to the naming rules mentioned previously in the present embodiments.

Figure 8:
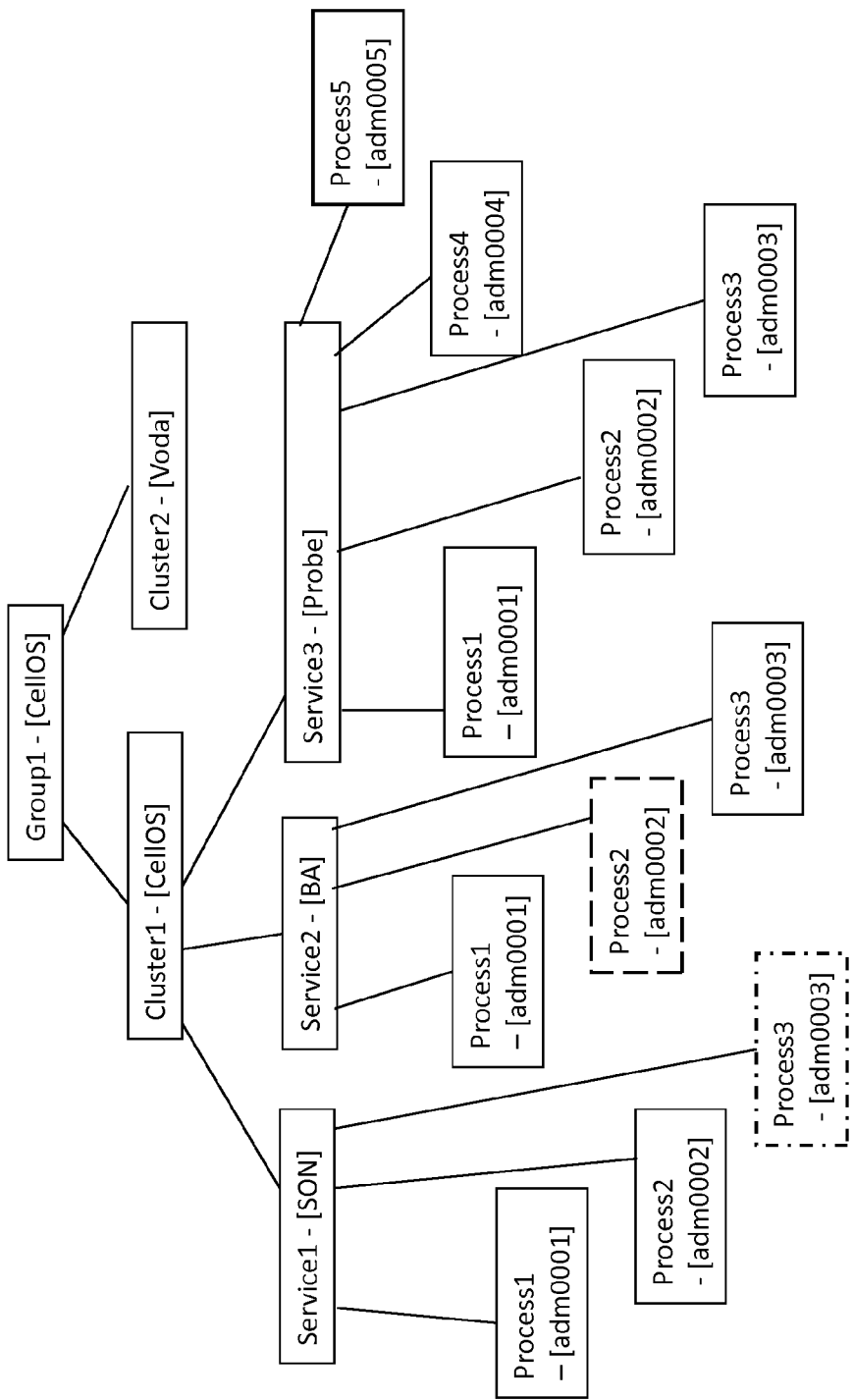
FIG. 8 is a schematic diagram illustrating a change in the exemplary hierarchical structure of services and processes in the network infrastructure.

FIG. 8 is a schematic diagram illustrating a change in the exemplary hierarchical structure of services and processes in a network infrastructure. The change is made with respect to a previous state shown in FIG. 7. Referring to FIG. 8, for instance, due to lower working load on the "Service1" required by the user, the "Process3" (illustrated with dashed line) is shut down by the NMP entity N1-31 of the application node N1 which previously runs the "Process3" of the "Service1". The NMP entity N1-31 may firstly detect operational status of the "Process3" at low utilization rate, reports such low utilization status information to the management process module A1-31 of administration node A1, and may be subsequently instructed by the management process module A1-31 to shut down the "Process3" under "Service1".

In one embodiment, on sudden increase in work load of the "Service3", a NMP entity N1-31 of an application node A1 may be instructed to initialize the "Process5" under "Service3" by the management process module A1-31 of administration node A1. In another embodiment, due to low working loads of the application node Nx, "Process2" under "Service2" may be migrated by the NMP entity Nx-31 of the application node Nx to another application node. The IP address, the port number and the operational status of the changed "Process3" under "Service 1", "Process2" under "Service2" and "Process5" under "Service3" may be delivered on-time to their belonging service objects as well as all processes which are interested in any change of these processes. In this case, the service and process objects which are interested in any change of configuration information of "Process3" under "Service 1" may be called "interested stakeholder process/service entity" of "Process3" under "Service1", respectively.

In order to address the frequent and adaptive change of the status of the process objects in the computing network infrastructure, the proposed method of managing services in the computing network infrastructure may further include another feature of "Filtered Updates/Conditional Updates". The "Filtered Updates/Conditional Updates" helps the process running in one of the plurality of application nodes to achieve "Online Updates of Configurations & Operational Status" of any process in the computing network infrastructure.

Several procedures may be performed during the initialization phase of any process for achieving the "Filtered Updates/Conditional Updates". For example, after a service is initialized by the management process module A1-31 of administration node A1, each process of the service will have their respective application programming interface (API) configured by the management process module A1-31. The API of each process may store the configuration information about what external process(es) or service(s) may be interested in any changes in their respective configuration information. The CLP entity A1-32 in the administration node A1 may then query API of each process and stores the list of interested stakeholder process/service of each process in the cluster. The list of interested stakeholder process/service indicates that which external process (es) or service(s) are interested in receiving updates on any changes in configuration information of the present process. The CLP entity A1-32 in the administration node A1 may know which process (es) or service(s) in the cluster may be interested in receiving notifications of any particular process running in any application node.

Similarly, the CLP entity of each application node may also query API of each process running in the application node and then store the list of interested stakeholder process/service of each process in the cluster. As such, the CLP entity in each application node knows which process(es) or service(s) in the cluster may be interested in receiving notifications of any change in operational status of the user binary/user application running in the application node.

In one embodiment, by implementing "Filtered Updates/Conditional Updates", the changes of configuration information of any process may be delivered to the "interested stakeholder processes/services" on time. For example, the CLP N1-32 of the application node N1 will generate filtered updates such as "G1.C1.S1.*" when the configuration information of a process with a name "G1.C1.S1.P2" is changed, where "*" is wildcard character represents anyone under G1.C1.S1 namespace. In another example embodiment, the filtered update may be "G1.C1.*.*", which represents any services and processes under the cluster "G1.C1".

For clearly describing the "Filtered Updates/Conditional Updates", following examples are used in accordance with FIG. 7. Referring to FIG. 7, when the "Service1" is first initialized, the first process "Process 1" may be initialized by a NMP entity of an application node according to instructions and initialization configuration information from the management process module A1-31 of administration node A1. The management process module A1-31 also informs the CLP entity of the same application node about which service or other process will be interested in any change of the configuration information of the "Service1" and "Process1". Similarly, when the "Process3" is firstly initialized by another application node Nx for the same "Service1", the management process module A1-31 may also tell the CLP entity Nx-32 of this application node Nx that "Process1" and "Process2" under "Service1" will be interested in any change of the configuration information of the "Process3". The configuration information may include: IP address and port number assigned to "Process3", protocol type used by the "Process3", current CPU utilization rate of "Process3", current memory utilization rate of "Process3", and an operational status of "Process3" being "UP/DOWN".

Similarly, after the "Process3" is successfully shut down by the NMP Nx-31 of the present application node Nx, the NMP Nx-31 may know that it needs to provide "PUSH notification" on time to the interested stakeholders such as "Service1" along with "Process1" and "Process2" under "Service1" stored in the API of the "Process3" and the CLP entity Nx-32 of the present application node Nx. The NMP Nx-31 of the present application node Nx may issue an instruction to the CLP Nx-32 of the application node Nx for sending an notification about {Status=DOWN} for "Process3" to all interested stakeholders. The CLP entity Nx-32 then checks the interested stakeholders of the "Process3" in their respective database, and determines to generate a "Filtered Update/Conditional Update" message with a filtered names of "cellos.cellos.SON.*" along with the {Status=DOWN}. In the "Filtered Update/Conditional Update" message, there is also a source field of "cellos.cellos.SON.adm0003", such that the recipient may identify which process's configuration information is changed.

In the network infrastructure 30, the CLP entity of any application node or the administration node may include a routing table along with the database storing hierarchical names of related services and related processes. Therefore, when the "Filtered Update/Conditional Update" message showing a filtered names of "cellos.cellos.SON.*" along with the {Status=DOWN} is transmitted from the CLP entity Nx-32 to neighbouring application node(s), other application node(s) may easily determine which process(es) and Service(s) should be the destination, and provides necessary routing of the "Filtered Update/Conditional Update" message. Even for the scenarios, where the network infrastructure 30 is deployed over a large geographic area, within a few seconds, all interested stakeholders such as "Service1", "Process 1" and "Process2" under "Service1" may be informed that "Service3" is successfully shut down. Also, the management process module 431 of administration node 4 will be informed of the successful shutdown of "Process3" under "Service1".

Subsequently, the API of the "Service1", "Process1" and "Process2" may update their APIs respectively; and their Applications Nodes' CLP entities may also update their routing tables and the name resolution mapping tables, respectively.

In another embodiment of "Filtered Update/Conditional Update", the "Process2" under "Service2" is currently running on one core of the processor in the application node Nx. When the management process module A1-31 of administration node A1 instructs the NMP entity Nx-31 of the application node Nx to migrate the "Process2" to the application node N1, the NMP entity Nx-31 will issue an instruction to the CLP entity Nx-32 of the application node Nx for sending an notification about {Status=MIGRATED } for "Process2" under "Service2" to all interested stakeholders, after the successful migration of the "Process2". The CLP entity Nx-32 checks the interested stakeholders of the "Process2" in their respective databases, and determines to generate a "Filtered Update/Conditional Update" message with a filtered names of "cellos.cellos.BA.*" along with the {Status=MIGRATED}. In the "Filtered Update/Conditional Update" message, there is also a source field of "cellos.cellos.BA.adm0002", such that the recipient may identify which process's configuration information is changed.

In yet another embodiment of "Filtered Update/Conditional Update", when the "Process5" under "Service3" is not running on one core of the processor in the application node Nx, the management process module A1-31 of administration node A1 may instruct the NMP entity Nx-31 of the application node N4 to initialize the "Process5" on the application node Nx. Then, after the successful initialization of the "Process5", the NMP entity Nx-31 will issue an instruction to the CLP entity Nx-32 of the present application node Nx for sending a notification about {Status=INITIALIZED} for "Process5" under "Service3" to all interested stakeholders.

The CLP entity Nx-32 checks the interested stakeholders of the "Process5" in their respective databases, and determines to generate a "Filtered Update/Conditional Update" message with a filtered names of "cellos.cellos.Probe.*" along with the {Status=INITIALIZED}. In the "Filtered Update/Conditional Update" message, there is also a source field of "cellos.cellos.Probe.adm0005", such that the recipient may identify which process's configuration information is changed.

As mentioned previously, the interested stakeholders may belong to the same service. In one embodiment, for other scenarios cross-service communication(s) may be required. For example, the processes under "Service2" (i.e., BA) may need results from some or all processes under "Service3" (i.e., Probe). Therefore, in such cases, the processes under "Service2" may register their interests in being notified of any changes in configuration information of the processes under "Service2". The "Filtered Update/Conditional Update" message may be sent out to other application nodes with more than one set of filtered names in addition to "cellos.cellos.Probe.*".

By implementing the "Filtered Update/Conditional Update", the proposed method to manage services in the network infrastructure may achieve reduced network usage compared with conventional "PULL" model for DNS update from DNS server. The network usage of PUSH notification is much less compared with the conventional PULL model of conventional DNS system. Further, the on-time updates on any change of configuration information of processes in the cluster or across clusters may be easily delivered to the interested stakeholders. Each process in the network infrastructure does not need to query DNS server for any changes of name-IP address mapping relationship. The changes in configuration information, operational status, IP address or port number of any process will be delivered to interested process (es) or interested service(s) by the CLP of the application node N1 which runs the process with changed configuration information. Finally, due to on-time updates on any change in configuration information of processes, consistency and reliability of the services in the network infrastructure may be achieved with high availability.

The following descriptions will describe in details about the process of naming a cluster, naming a service under a cluster and naming a process under a service further under a cluster according to the hierarchical naming system. Also, the following descriptions will describe in details about each process registering in/subscribing to the interests of being informed of any changes in the configuration information of any process in the network infrastructure. Furthermore, following descriptions will describe in details about the steps involved in initializing a process, shutting down a process, migrating a process and detecting a failure of a process in the network infrastructure.

Figure 9:
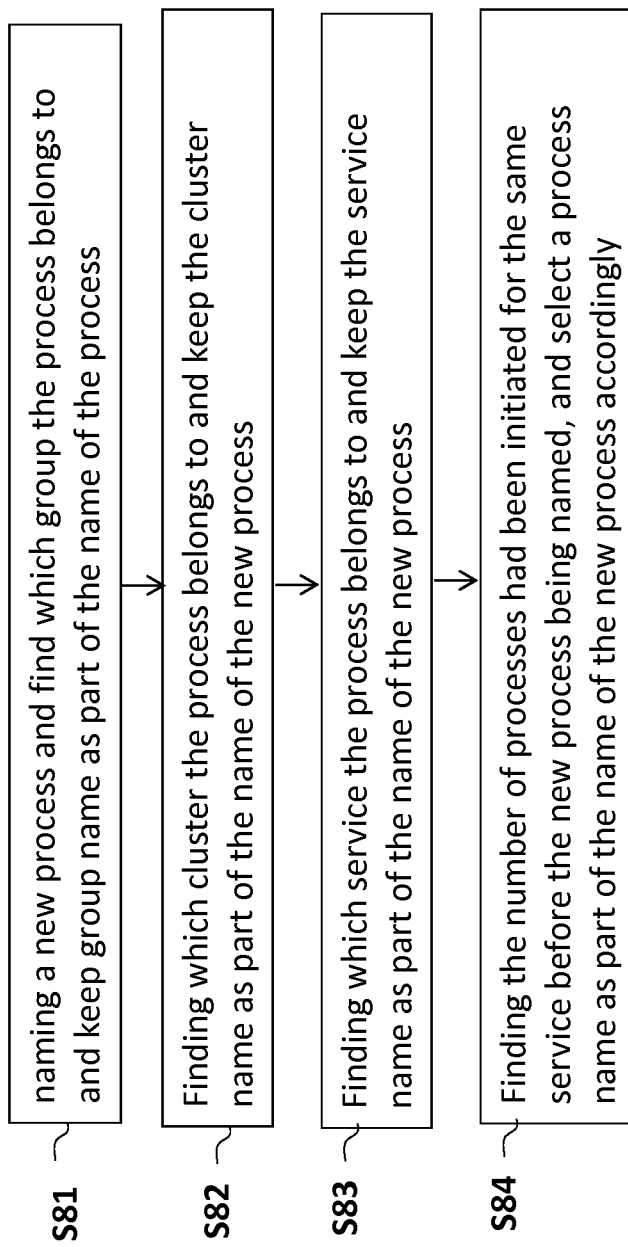
FIG. 9 is a flowchart illustrating a method of naming a process according to the hierarchical naming system in the network infrastructure in accordance with an exemplary embodiment.

FIG. 9 is flowchart illustrating a method of naming a process according to the hierarchical naming system in the network infrastructure 30 in accordance with an exemplary embodiment. The method of naming a process illustrated in FIG. 9 is a partial process in the method of managing service in the network infrastructure. Here, "naming a process" may refer to assigning a name to a process under a service which is under cluster and the group. For instance, when the "Process1" belonging to "Service1" which further belongs to "Cluster1" and "Group1" is initialized, the process illustrated in FIG. 9 describes how the management process module A1-31 of an administration node A1 would name the process. However, the method of naming process is not limited to the role of the management process module A1-31, and the NMP entity N1-31 in the application node N1 on which the new process is running may also be configured to name a process according to the same procedures.

The "naming of process" may be performed when the "process" is initialized on an application node. Referring to FIG. 9, at step S81, when the management process module A1-31 of an administration node A1 or the NMP entity N1-31 of an application node N1 intends to name a process, the management process module A1-31 or the NMP entity N1-31 may firstly find which group the process belongs to and determine the group name as part of the name of the process. If there is only cluster required to be named, then the management process module A1-31 or the NMP entity may stop after the step S81, select a cluster name and finally assign the cluster with a name consisting of the determined group name and the selected cluster name. In some cases, the cluster name may be assigned by the user via a user interface rather than the management process module A1-31 or the NMP entity N1-31 automatically assigns the name for the cluster.

At step S82, the management process module A1-31 or the NMP entity N1-31 next find which cluster the process belongs to and determine the cluster name as part of the name of the process. If there is only service required to be named, then the management process module A1-31 or the NMP entity N1-31 may stop after the step S82, select a service name and finally assign the service with a name consisting of the determined group name, the determined cluster name and the selected service name. In some cases, the service name may be assigned by the user via a user interface rather than the management process module A1-31 or the NMP entity N1-31 automatically assigns the name for the service.

At step S83, the management process module A1-31 or the NMP entity N1-31 further finds which service the process belongs to and determines the service name as part of the name of the process. At step S84, the management process module A1-31 or the NMP entity N1-31 may find the number of processes that had been initialized for the same service before the present process being named, and then accordingly select a process name as part of the name of the process. Finally, the management process module or the NMP entity N1-31 may assign the process with the name consisting of the determined group name, the determined cluster name, the determined service name and the selected process name. For example, referring to FIG. 8, when the "Process5" is initialized in the application node N1, the management process module A1-31 of the administration node A1 or the NMP entity N1-31 of the application node N1 may determine the "Process5" belongs to "Service3", further belonging to "Cluster1" and also belonging to "Group 1". As such, the management process module A1-31 or the NMP entity N1-31 may determine the name of the "Process5" should include "CellOS" (as the group name), "CellOS" (as the cluster name), and "Probe" (as the service name) for the "Process5". Furthermore, the management process module 431 or the NMP entity N1-31 may determine there are already four processes initialized before the "Process5", and thus the "Process5" will be assigned a process name of "adm0005". In this case, when forward FQDN style is used, the management process module A1-31 or the NMP N1-31 may assign the name of "Process5" as "cellos.cellos.probe.adm0005". On the other hand, when backward FQDN style is used, the management process module A1-31 or the NMP N1-31 may assign the name of "Process5" as "adm0005.probe.cellos.cellos".

By following the method of assigning a name to a process illustrated in FIG. 9, several effects may be achieved such as: Distinguishable Name Space; Guessable names for new services; and Human readable name in the "Hierarchical Naming system". The "Hierarchical Naming system" and the method of naming a process also form the foundation of the other partial processes, which will be illustrated in following FIGS. 10-14.

Figure 10:
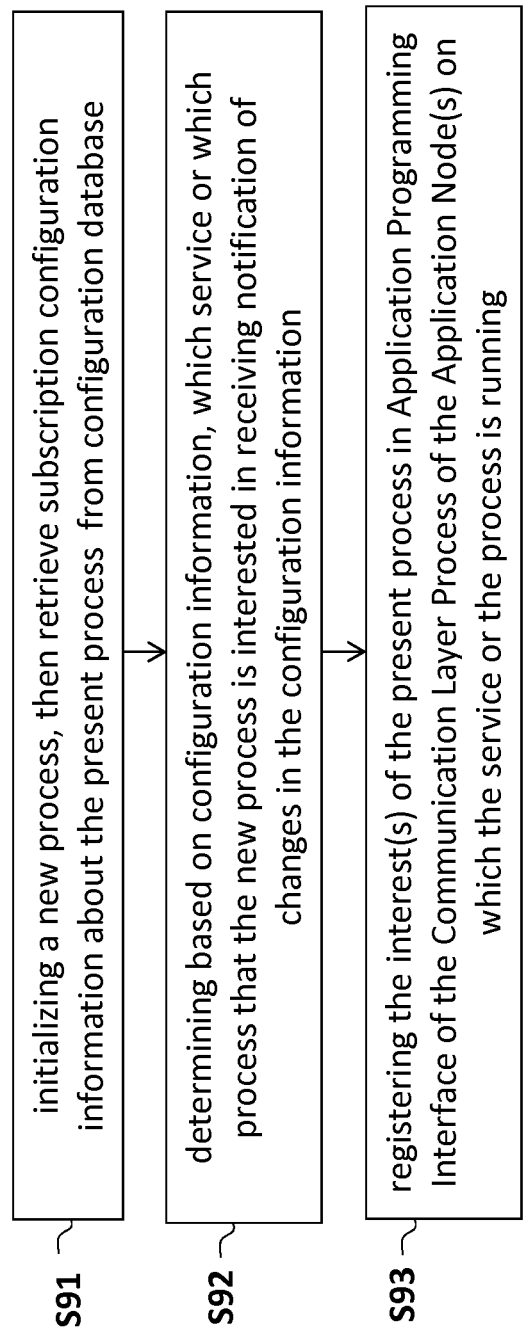
FIG. 10 is a flowchart illustrating a method of registering interest of being informed of any changes in the configuration information of any process in the network infrastructure according to an exemplary embodiment.

FIG. 10 is a flowchart illustrating a method of registering interest of being informed of any changes in the configuration information of any process in a network infrastructure according to an exemplary embodiment. The method of "registering interest of being informed of any changes in the configuration information of any process" illustrated in FIG. 10 is a partial process in the method to manage service in the computing network infrastructure. Here, the management process module A1-31 of the administration node A1 may include a database containing information regarding which process or which service should receive change in configuration information of any process/other process(es) in the network infrastructure 30. Therefore, when the process is initialized by the management process module A1-31 of the administration node A1 or the NMP entity N1-31 of any application node, or when the first process of a service is initialized or by management process module A1-31 of the administration node A1 or the NMP entity N1-31 of any application node, the management process module A1-31 or the NMP entity N1-31 will also subscribe to receiving the notification of any change in the configuration information by registering such notification interest in the API of the CLP entity of the application node on which the service or the process is operating.

Referring to FIG. 10, at step S91, when the management process module A1-31 of the administration node A1 or the NMP entity N1-31 of an application node initiates/initializes a process, the management process module A1-31 or the NMP entity retrieves "subscription configuration information" about the present process from a configuration database in the management process module A1-31. In some cases, the "subscription configuration information" may be included in the "initialization configuration information" of the process to be initialized. For example, "Process5" is initialized in the application node N1, the management process module A1-31 or the CLP N1-32 of the application node N1 may retrieve "subscription configuration information" about the present process from a configuration database in the management process module A1-31 prior to initialization of the "Process5". The "subscription configuration information" at least indicates which service or process is directly associated with the present "Process5".

Next, when the "subscription configuration information" of the present process is retrieved from the configuration database of the management process module A1-31, at step S92, the management process module A1-31 or the NMP entity N1-31 of the application node N1 may determine which service or which process the present process is interested in receiving notification(s) of any change(s) in their respective configuration information. Such determination is made according to the retrieved "subscription configuration information" from the configuration database. For example, "Process5" under "Service3" may be interested in receiving notifications of any changes in configuration information of any one of "Process1"-"Process4" under "Service3".

At step S93, the management process module A1-31 or the NMP entity N1-31 may register the interest(s) of the present process in the API of the CLP entity/entities of the application node(s) on which the service or the process is running In one embodiment, "Process1", "Process2", "Process3", "Process4" and "Process5" belonging to the "Service3" shown in FIG. 8 are respectively operating in application nodes N1, N2, N3, N4 and N5. Once the "subscription configuration information" of "Process5" indicates that the "Process5" should be interested in receiving notification(s) of any changes in configuration information of several processes such as "Process 1", "Process2", "Process3", "Process4" under "Service3", the "Process5" may respectively register in the CLP entities of the application nodes N1, N2, N3, N4 and N5 about the interests of receiving notification(s) of any change(s) in respective configuration information of "Process1", "Process2", "Process3", "Process4".

Figure 11:
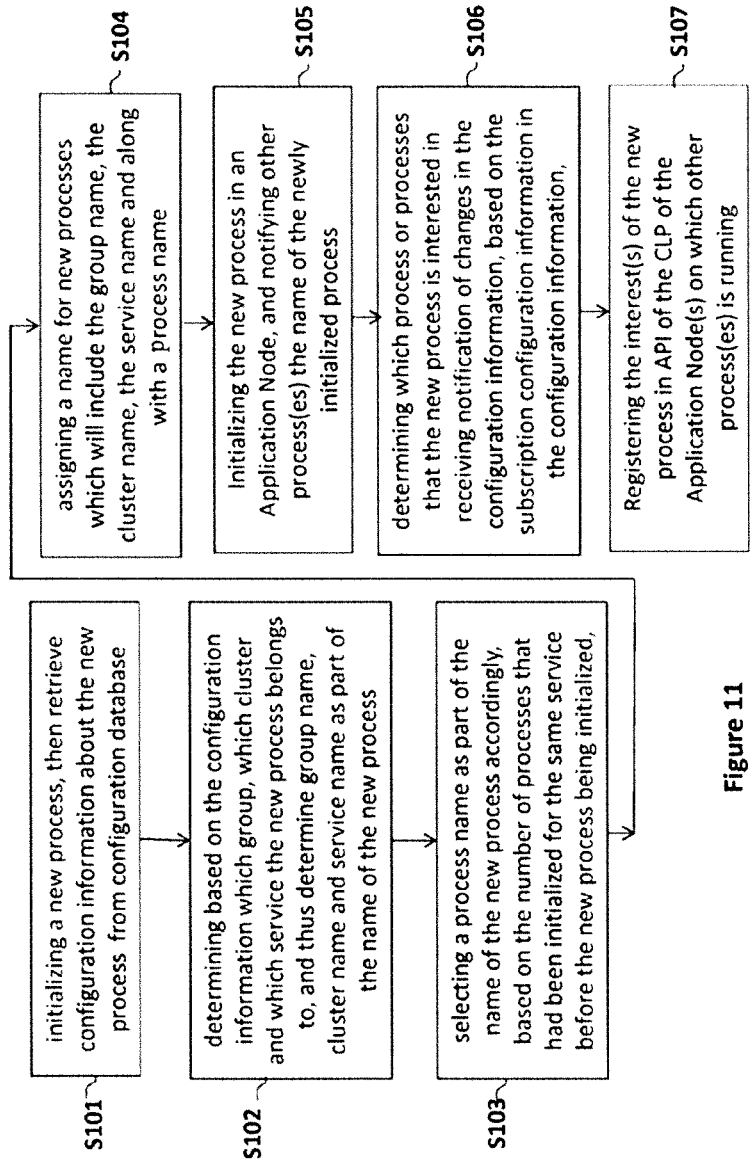
FIG. 11 is a flowchart illustrating a method of initializing a process in the network infrastructure according to an exemplary embodiment.

FIG. 11 is a flowchart illustrating a method of initializing a process in the network infrastructure according to an exemplary embodiment. The method of "initializing a process" illustrated in FIG. 11 is a partial process in the method to manage services in the network infrastructure and may include procedures illustrated in both FIG. 9 and FIG. 10. Referring to FIG. 11, at step S101, when the NMP entity of an application node intends to initiate/initialize a process, the NMP entity may firstly retrieve "initialization configuration information" of the present process from the configuration database in the management process module A1-31 of the administration node A1.

At step S102, according to the "initialization configuration information", the NMP entity N1-31 may respectively determine which group, which cluster and which service the present process belongs to, and thus determine the group name, the cluster name and the service name as part of the name or Fully Qualified Domain Name (FQDN) of the present process.

At step S103, the NMP entity may further determine the number of processes that had been initialized for the same service before the present process being initialized, and then select a process name as part of the name of the process. According to the number of processes had been initialized for the same service before the present process being named, the NMP entity N1-31 may select a process name as part of the name of the process accordingly.

At step S104, for the present process, the NMP entity N1-31 then assigns the newly initialized process a name consisting of the determined group name, the determined cluster name, the determined service name and the selected process name. At step S105, the NMP entity N1-31 may initialize the present process in the application node N1; and the NMP entity N1-31 may notify other object(s) the name of the present process. For example, after the initialization of the "Process5", the NMP N1-31 of the application node N1 may instruct the CLP entity N1-32 thereof to notify the "Process1"-"Process4" under the same "Service3" in the network infrastructure 30. Then, "Process1"-"Process4" under the same "Service3" as the interested stakeholder process(es) may receive a "Conditional Update" message with {Status=INITIALIZED} and {Name=adm0005.probe.cellos.cellos}. The "Conditional Update" message may also carry the sender's layer 3 address and layer 4 port number. Subsequently, the "Service3" and "Process1"-"Process4" under the same "Service3" may update their APIs; and their Applications Nodes' CLP entities may also update their routing tables and the name resolution mapping table accordingly.

At step S106, according to the subscription configuration information in the configuration information, the NMP entity N1-31 of the application node N1 may determine which process(es) that the present process is interested in receiving notification of changes in their respective configuration information. At step S107, the NMP entity N1-31 of the application node N1 may register the interest(s) of the present process in API of the CLP entity of the application node(s) on which other process(es) is running.

Figure 12:
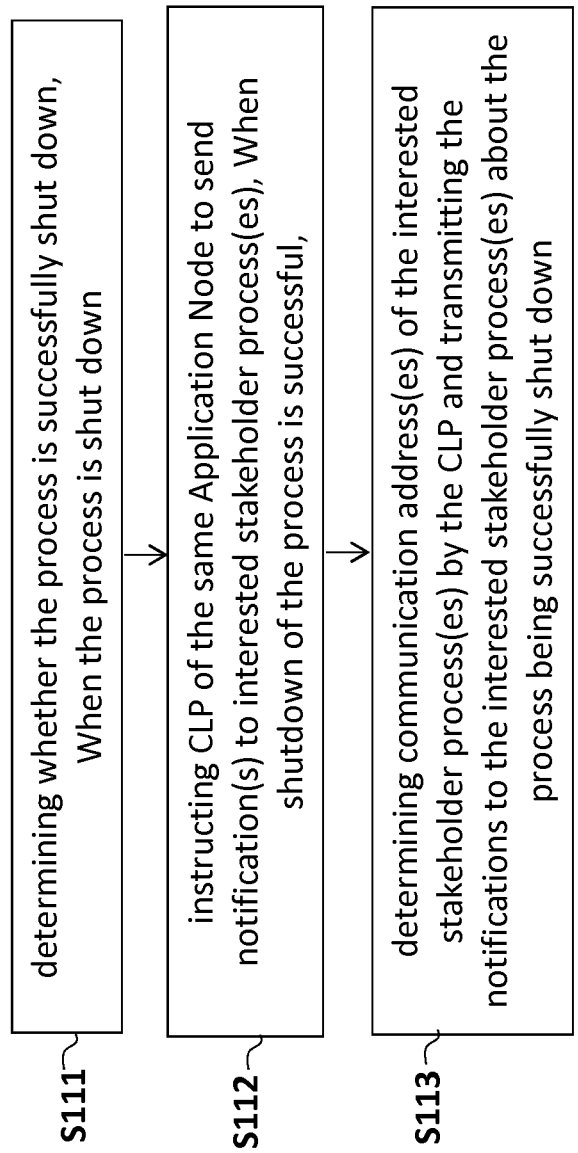
FIG. 12 is a flowchart illustrating a method of shutting down a process in the network infrastructure according to an exemplary embodiment.

FIG. 12 is a flowchart illustrating a method of shutting down a process in the network infrastructure according to an exemplary embodiment. The method of "shutting down a process" illustrated in FIG. 12 is a partial process in the method to manage service in the computing network infrastructure and may be dependent upon procedures illustrated in both FIG. 9, FIG. 10 or FIG. 11.

Referring to FIG. 12, at step S111, when the NMP entity N1-31 of an application node N1 shuts down a process, the NMP entity N1-31 may determine whether the process is successfully shut down. At step S112, when it is determined that shutdown of the process is successful, the NMP entity then may instruct the CLP entity A1-32 of the same application node N1 on which the process was running to transmit notification(s) to interested stakeholder process(es)/service(s). Here, the interested stakeholder process(es) or service(s) may refer to, for example, those process(es) or service(s) which had registered their interests in receiving any notifications regarding the configuration information of the process being shut down. In some cases, the interested stakeholder process(es) or service(s) may also include the management process module A1-31 of the administration node A1 and the first process (usually the NMP entity N1-31) of the service to which the process being shut down belongs.

For example, in FIG. 8, the "Process 1" of "Service3" may be the NMP entity of "Service3", and "Service1" and other processes may be the interested stakeholder process(es) of "Process5" belonging to "Service3". For example, when the NMP entity N1-31 of the application node N1 needs to perform a conditional update for the "Process5", the NMP entity N1-31 of the application node N1 may firstly generate a conditional update message with at least one name string matching to names of the determined process or processes, where the at least one name string may be "cellos.cellos.probe.*". Then, the NMP entity N1-31 may further instruct the CLP entity N1-32 to forward the conditional update message according to at least one name string. In one embodiment, the length of the name string may be shorter in order to facilitate short addressing of the processes or services running in the network infrastructure 30. For example, a shorter addressing having at least one name string may be "cellos.process3", wherein "process3" is addressed through a shorter name string. Similarly, the other embodiments in present invention may facilitate shorter addressing for initialization of any process or conditional update.

At step S113, the CLP entity N1-32, being instructed by the NMP entity N1-31, may determine communication address(es) of the interested stakeholder process(es) and transmit the notifications to the interested stakeholder process(es) about the process which is successfully shut down. For example, when the "Process5" is successfully shut down by the NMP N1-31, the CLP N1-32 of the same application node N1 may determine the communication address(es) such as IP address and port number of the process(es) in the list of the interested stakeholder process(es) according to the name string such as "cellos.cellos.probe.*" generated by the NMP entity N1-31. Then, these interested stakeholder process(es) will receive a "Conditional Update" message with {Status=SHUTDOWN} from the CLP N1-32. The "Conditional Update" message may also carry the sender's IP address and Transport layer port number. Accordingly, the interested stakeholder process(es) which receive the "Conditional Update" message may update their respective lists of related processes, and their CLP entities may respectively update their routing tables and the name resolution mapping tables accordingly.

Figure 13:
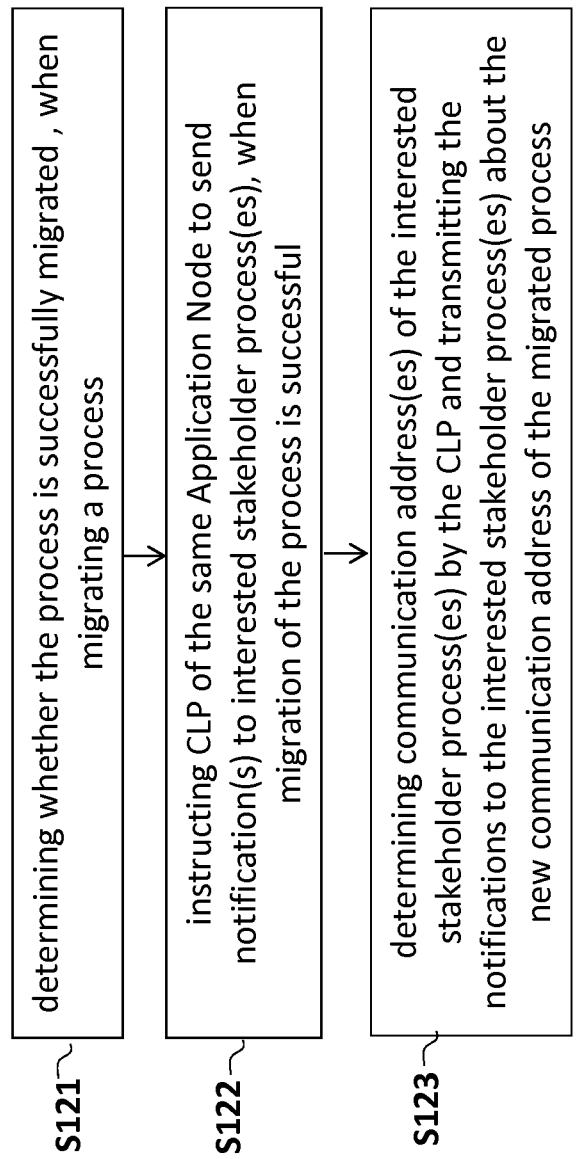
FIG. 13 is a flowchart illustrating a method of migrating a process in the network infrastructure according to an exemplary embodiment.

FIG. 13 is a flowchart illustrating a method of migrating a process in the network infrastructure according to an exemplary embodiment. The method of "migrating a process" illustrated in FIG. 13 is a partial process in the method to manage service in the network infrastructure and may be dependent upon procedures illustrated in both FIG. 9, FIG. 10 or FIG. 11. In step S121, when the NMP entity N1-31 of an application node N1 migrates a process, the NMP entity N1-31 may determine whether the process is successfully migrated.

At step S122, when determined that migration of the process is successful, the NMP entity of the new application node to which the process is migrated may determine to instruct the CLP entity of the same application node to send notification(s) to interested stakeholder process(es)/service(s). Here, the interested stakeholder process(es))/service(s) may refer to, for instance, those process(es))/service(s) which had registered their interests in receiving any notifications regarding the configuration information of the process being migrated.

At step S123, the CLP entity may determine communication address(es) of the interested stakeholder process(es) and transmit the notifications to the interested stakeholder process(es) about the process being successfully migrated. For example, when the "Process5" under "Service3" is successfully migrated from the application node N1 to the application node Nx, the NMP entity Nx-31 of the application node Nx may determine that the interested stakeholder process(es) are the processes under the same "Service3". Once the NMP entity Nx-31 receives the conditional update, the NMP entity Nx-31 generates the wildcard name string of "cellos.cellos.probe.*" according to the determined "interested stakeholder process(es)". Furthermore, the CLP entity Nx-32 of the application node Nx may determine the communication address(es) such as IP address and port number of the process(es) according to the wildcard name string.

Next, these interested stakeholder process(es) will receive a "Conditional Update" message with {Status=MIGRATED}. The "Conditional Update" message may also include the new communication address of the migrated process. Accordingly, the interested stakeholder process(es) which receive the "Conditional Update" message may update their respective lists of related processes and their CLP entities may respectively update their routing tables and the name resolution mapping tables accordingly.

Figure 14:
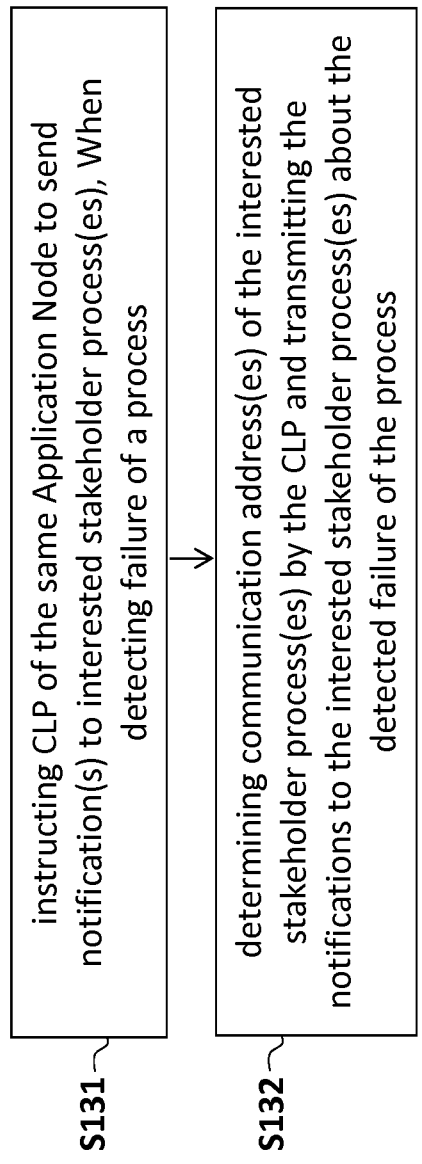
FIG. 14 is a flowchart illustrating a method of detecting a failure of a process in the network infrastructure according to an exemplary embodiment.

FIG. 14 is a flowchart illustrating a method of detecting a failure of a process in the network infrastructure according to an exemplary embodiment. The method of "detecting a failure of a process" illustrated in FIG. 14 is a partial process in the method to manage service in the network infrastructure and may be dependent upon procedures illustrated in both FIG. 9, FIG. 10 or FIG. 11. Here, the failure of a process may include, but not limited to, an unexpected shutdown, suspension or restart of the process.

Referring to FIG. 14, at step S131, when the NMP entity N1-31 of the application node A1 detects a failure of a process, the NMP entity N1-31 may generate a conditional update message and determine the interested stakeholder process(es)/service(s). Then, the NMP entity N1-31 may instruct the CLP entity N1-32 of the same application node A1 to send notification(s) to interested stakeholder process(es)/service(s). The interested stakeholder process(es)/service(s) may be previously registered by the NMP entity N1-31 of the application node A1.

At step S132, the CLP entity N1-32 of the application node A1 may determine communication address(es) of the interested stakeholder process(es)/service(s) according to the interested stakeholder process(es)/service(s). Here, the interested stakeholder process(es)/service(s) may refer to, for instance, those process(es) which had registered their interests in receiving any notifications regarding the configuration information of the process. Then, the CLP entity N1-32 may determine the communication address(es) of the interested stakeholder process(es)/service(s) and transmit the notifications to the interested stakeholder process(es)/service(s) about the detected failure of the process.

For example, when the "Process5" is unexpectedly shut down, the NMP entity Nx-31 of the application Nod Nx may determine the interested stakeholder process(es)/service(s) should receive the conditional update. The NMP entity Nx-31 may generate the wildcard name string of "cellos.cellos.probe.*". Then, the CLP entity Nx-32 of the application node Nx may determine the communication address(es) such as IP address and port number of the process(es) according to the wildcard name string.

The CLP entity Nx-32 may determine the communication address(es) such as IP address and port number of the process(es) according to wildcard name string of "cellos.cellos.probe.*". The wildcard name string matches those processes in the list of the interested stakeholder process(es). Subsequently, these interested stakeholder process(es)/service(s) may receive a "Conditional Update" message with {Status=FAILURE-SHUTDOWN}. In another example embodiment, when the "Process5" is unexpectedly restarted, the CLP entity of the same application node may send a "Conditional Update" message with {Status=FAILURE-RESTART} to these interested stakeholder process(es).

The "PUSH notification" may be performed by the CLP entity of an application node when operational status or configuration information of any process is changed. Here, the change in the operational status or configuration information of any process may be, for instance, a process may be shutdown unexpectedly, shutdown according to schedule, migrated to another physical machine, initialized or restarted after shutdown, etc. Also, "PUSH notification" may be implemented based upon a Hierarchical Naming System infrastructure. However, the "Filtered Update" may be performed by any process in any node including application node or administration node.

In one embodiment, when the management process module A1-31 of the administration node A1 plans to announce a configuration changes to each OAMP service (which is responsible for storing configuration information regarding operation, administration and maintenance) in each cluster, then the management process module A1-31 may generate a first "Filtered Update" message with a filtered destination name such as "cellos.*.oamp". Here, the "Filtered Update" is the same as the "conditional update", and is a subset of the "PUSH notification". Next, the management process module A1-31 passes this first "Filtered Update" message to the CLP entity A1-32 of the administration node A1. The CLP entity A1-32 will determine the communication addresses corresponding to the filtered destination names of "cellos.*.oamp", and delivers the "Filtered Update" message to the each OAMP service in each cluster.

In another example embodiment, when the management process module A1-31 plans to announce an emergency message to each NMP service in each cluster of each group, then the management process module A1-31 may generate a second "Filtered Update" message with a filtered destination name such as "*.*.nmp". Next, the management process module A1-31 passes the second "Filtered Update" message to the CLP entity A1-32 of the administration node A1. The CLP entity A1-32 will determine the communication addresses corresponding to the filtered destination names of "*.*.nmp", and delivers the "Filtered Update" message to the each NMP service in each cluster.

For yet another example, when an alarm process entity of a SON service needs to communicate with all NMP entities of all L2L3 services (which are services respectively responsible for corresponding base station's layer 2 and layer 3 protocol stack service in a wireless communication system) in all user groups, then the alarm process entity may generate a third "Filtered Update" message with a filtered destination name such as "*.*.1213.nmp". Next, the NMP entity passes the third "Filtered Update" message to the NMP entity of the application node where the alarm process entity is operating. The NMP entity will determine the communication addresses corresponding to the filtered destination names of "*.*.1213.nmp", and delivers the "Filtered Update" message to the each NMP service of each L2L3 service in all user groups.

By executing the methods to manage service in network infrastructure allocation shown in preceding exemplary embodiments, the network system will be more efficient in assigning names to processes or services, when require dynamically initiating/initializing process objects or service instances in a computing network infrastructure. Also, on-time updates on changes in configuration information are achieved through "PUSH notifications" and "conditional updates". Furthermore, each process entities of any service or the management module in administration node only need to store the name of the process entity that needs to communicate with, but does not need to maintain the name resolution mapping table. The CLP entity of each application node or the administration node is responsible for the name resolution, forwarding message(s), and receiving the message(s) delivered through network layer communication address(es).

Furthermore, the change of the operational status may include but not limited to: the first process experiencing failure, the first process being accidentally shutdown, the first process being restarted, the first process being migrated or the first process being successfully shutdown.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that may carry, store, communicate, propagate or transport the instructions for use by or in connection with an instruction execution system, apparatus, or device, such as a computing device, a network infrastructure shown in FIG. 3. In one example embodiment, the network infrastructure (10, 30) may be a cloud computing infrastructure.

A computer-readable medium may include a computer-readable storage medium (e.g., a physical device) that may be any media or means that may carry or store the instructions for use by or in connection with a system, apparatus, or device, such as a computer or a communication device. For instance, the memory unit may include the computer-readable medium which may further include computer program code, when executed by the processor unit, may cause the management process module and the CLP entity in the administration node, the CLP entity and NMP entity in the application node to perform procedures/steps illustrated in FIGS. 9-14.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

What is claimed is:

1. A system to manage services in a network, said system comprising: at least one administration node; and a plurality of application nodes connected to each other and said at least one administration node, wherein each application node comprises routing tables and forward domain name resolution tables related to at least one other application node of the plurality of application nodes, wherein a first application node from the plurality of application nodes upon receiving at least one instruction from one of said at least one administration node to initialize a first process, the first application node performs the following: retrieving, configuration information comprising a group name, a cluster name, and a service name related to the first process from a database of one of said at least one administration node; and assigning, a name comprising the group name, the cluster name, the service name along with a process name, to the first process, determining any of the other services or the other processes are interested in receiving notification of any change in the configuration information or operational status of the first process, registering the determined services or the determined processes that are interested in receiving notification of any change in the configuration information or the operational status of the first process, wherein the first application node is configured to monitor whether a working load on the first process is greater than a first predefined threshold or less than a second predefined threshold, wherein the administrator node instructs the first application node to change the configuration information and an operational status of the first process based upon the working load being determined as greater than the first predefined threshold or less than the second predefined threshold, and wherein the first application node further generates a conditional update message indicative of the change in configuration information and the operational status of the first process, wherein the conditional update message comprises a string concatenated with a special character indicating at least one other service or at least one other process to be notified with the conditional update message, wherein the conditional update message further comprises a source field indicating the change in configuration information and the operational status correspond to the first process, wherein the change in configuration information comprises each of the change of application node on which the first process is operating, change of a network layer address of the first process and change of port number of the first process, and wherein the first application node is further configured for notifying the registered services or the registered processes about the change in the configuration information or the operational status of the first process via the conditional update message, and wherein one or more application nodes, of the plurality of application nodes, hosting the at least one service or the at least one process is further configured to update the routing tables and the forward domain name resolution tables associated with the first application node based upon the change in configuration information and the operational status of the first process within the first application node.

2. The system as claimed in claim 1, wherein the first application node is configured to perform the following: initializing, the first process in the first application node, upon receiving the at least one instruction from said corresponding administration node; and notifying, other services or other processes in the network about the assigned process name of the first process.

3. The system as claimed in claim 2, wherein the first application node is further configured to perform the following: determining, which of other services or other processes in the network that the first process is interested in receiving notification of any change in the configuration information of the other services or the other processes; and subscribing, the interest of the first process to the plurality of application nodes on which the other services or the other processes are running.

4. The system as claimed in claim 1, wherein the change of the operational status comprises: the first process experiencing failure, the first process being accidentally shutdown, the first process being restarted, the first process being migrated or the first process being successfully shutdown.

5. A method to manage services in a network, said method comprising: retrieving, by one of application nodes in the network, configuration information comprising a group name, a cluster name, and a service name related to a first process from a database of one of at least one administration node in the network; assigning, by said one of the application nodes, a name comprising the group name, the cluster name, the service name along with a process name, to the first process running on said one of the application nodes from a plurality of application nodes in the network; determining, by said one of the application nodes, any of the other services or the other processes are interested in receiving notification of any change in the configuration information or operational status of the first process; registering, by said one of the application nodes, the determined services or the determined processes that are interested in receiving notification of any change in the configuration information or the operational status of the first process; monitoring, by said one of the application nodes, whether a working load on the first process is greater than a first predefined threshold or less than a second predefined threshold; changing, by said one of the application nodes, the configuration information and an operational status of the first process based upon the working load being determined as greater than the first predefined threshold or less than the second predefined threshold; generating, by said one of the application nodes, a conditional update message indicative of the change in configuration information and the operational status of the first process, wherein the conditional update message comprises a string concatenated with a special character indicating at least one other service or at least one other process to be notified with the conditional update message, wherein the conditional update message further comprises a source field indicating the change in configuration information and the operational status correspond to the first process, wherein the change in configuration information comprises each of the change of application node on which the first process is operating, change of a network layer address of the first process and change of port number of the first process; notifying, by said one of the application nodes, the registered services or the registered processes about the change in the configuration information or the operational status of the first process via the conditional update message; and updating, by one or more application nodes, hosting the at least one other service or the at least one other process, pre-stored routing tables and forward domain name resolution tables associated with the first application node based upon the change in configuration information and the operational status of the first process within the first application node.

6. The method as claimed in claim 5, wherein after the step of assigning the name to the first process, said method further comprising: initializing by said one of the application nodes, the first process in said one of the application nodes, upon receiving at least one instruction from one of said at least one administration node; and notifying by said one of the application nodes, other services or other processes in the network about the assigned name of the first process.

7. The method as claimed in claim 6, wherein after the step of initializing the first process, said method further comprising: determining by said one of the application nodes, which of the other services or the other processes in the network that the first process is interested in receiving notification of any change in the configuration information of the other services or the other processes; and subscribing by said one of the application nodes, the interest of the first process to the application nodes on which the other processes are running.

8. The method as claimed in claim 5, wherein the change in the operational status comprises: the first process experiencing failure, the first process being accidentally shutdown, the first process being restarted, the first process being migrated or the first process being successfully shutdown.

9. An apparatus adapted to manage services in a network, said apparatus comprising: a network interface, connected to at least one administration node and at least one application node, in the network; a communication manager unit, connected to the network interface and configured to: retrieve configuration information comprising a group name, a cluster name, and a service name related to a first process from a database of one of the at least one administration node; assign a name comprising the group name, the cluster name, the service name along with a process name, to the first process; determine any of the other services or the other processes are interested in receiving notification of any change in the configuration information or operational status of the first process; register the determined services or the determined processes that are interested in receiving notification of any change in the configuration information or the operational status of the first process; monitor whether a working load on the first process is greater than a first predefined threshold or less than a second predefined threshold; change the configuration information and an operational status of the first process based upon the working load being determined as greater than the first predefined threshold or less than the second predefined threshold; generate a conditional update message indicative of the change in configuration information and the operational status of the first process, wherein the conditional update message comprises a string concatenated with a special character indicating at least one other service or at least one other process to be notified with the conditional update message, wherein the conditional update message further comprises a source field indicating the change in configuration information and the operational status correspond to the first process, wherein the change in configuration information comprises each of the change of application node on which the first process is operating, change of a network layer address of the first process and change of port number of the first process; notify the registered services or the registered processes about the change in the configuration information or the operational status of the first process via the conditional update message; and facilitate one or more application nodes hosting the at least one other service or the at least one other process to update pre-stored routing tables and forward domain name resolution tables associated with the first application node based upon the change in configuration information and the operational status of the first process within the first application node.

10. The apparatus as claimed in claim 9, wherein the communication manager unit is configured to: initialize the first process in the apparatus, upon receiving at least one instruction from one of said at least one administration node through the network interface; and notify other services or other processes in the network about the assigned name of the first process.

* * * * *